United States Patent [19]

Merrick et al.

[11] Patent Number: 5,511,856
[45] Date of Patent: Apr. 30, 1996

[54] CABLE ACTIVATED HARNESS RETRACTOR FOR CHILD SEAT

[75] Inventors: David D. Merrick, Ethel; Allan R. Lortz, Noblesville; James R. Chinni; Jeffrey E. Peterson, both of Indianapolis, all of Ind.

[73] Assignee: Indiana Mills & Manufacturing, Inc., Westfield, Ind.

[21] Appl. No.: 189,964

[22] Filed: Feb. 1, 1994

Related U.S. Application Data

[63] Continuation-in-part of Ser. No. 14,111, Feb. 5, 1993, Pat. No. 5,380,066, which is a continuation-in-part of Ser. No. 897,872, Jun. 12, 1992, abandoned.

[51] Int. Cl.[6] .............................. A47C 31/00; A41F 1/00
[52] U.S. Cl. .................. 297/476; 297/479; 297/467; 24/611; 24/633
[58] Field of Search ..................... 297/476, 479, 297/467, 475, 474; 242/107.4 R; 24/633, 611

[56] References Cited

U.S. PATENT DOCUMENTS

| | | | |
|---|---|---|---|
| 2,483,044 | 9/1949 | Gongwater | 24/611 |
| 2,775,288 | 12/1956 | Anastasia | 24/611 |
| 2,889,095 | 6/1959 | Heidecke et al. | 24/611 |
| 3,294,447 | 12/1966 | Riley . | |
| 3,915,402 | 10/1975 | Takada . | |
| 4,025,111 | 5/1977 | Tanaka . | |
| 4,342,483 | 8/1982 | Takada . | |
| 4,720,148 | 1/1988 | Anthony et al. | 297/474 |
| 5,023,981 | 6/1991 | Anthony . | |
| 5,220,713 | 6/1993 | Lare, Jr. et al. | 24/633 |
| 5,275,437 | 1/1994 | Mödinger et al. | 24/633 |

FOREIGN PATENT DOCUMENTS

| | | | |
|---|---|---|---|
| 1293053 | 2/1987 | U.S.S.R. | 24/633 |
| 1311978 | 3/1973 | United Kingdom . | |

*Primary Examiner*—C. D. Crowder
*Assistant Examiner*—Bibhu Mohanty
*Attorney, Agent, or Firm*—Woodard, Emhardt, Naughton Moriarty & McNett

[57] ABSTRACT

A retractor for controlling the withdrawal of a belt therefrom operated by the locking engagement of a buckle and buckle tongue. A retractor frame having a spring biased rotatably mounted spool wrappingly receives one end of a belt harness, with the opposite end of the belt harness having fixed thereto either a buckle or a buckle tongue. Attached to a seat is either a buckle or a buckle tongue that receives the corresponding mating part of the buckle tongue combination which is attached to the belt harness. A locking bar is engagable with the ratchet shaped end plates of the spool to prevent further withdrawal of the belt harness. The locking engagement of the buckle and tongue causes movement of the locking bar into contact with the ratchet shaped end plates, which prevents the spool from rotating to allow any further withdrawal of the belt harness.

16 Claims, 18 Drawing Sheets

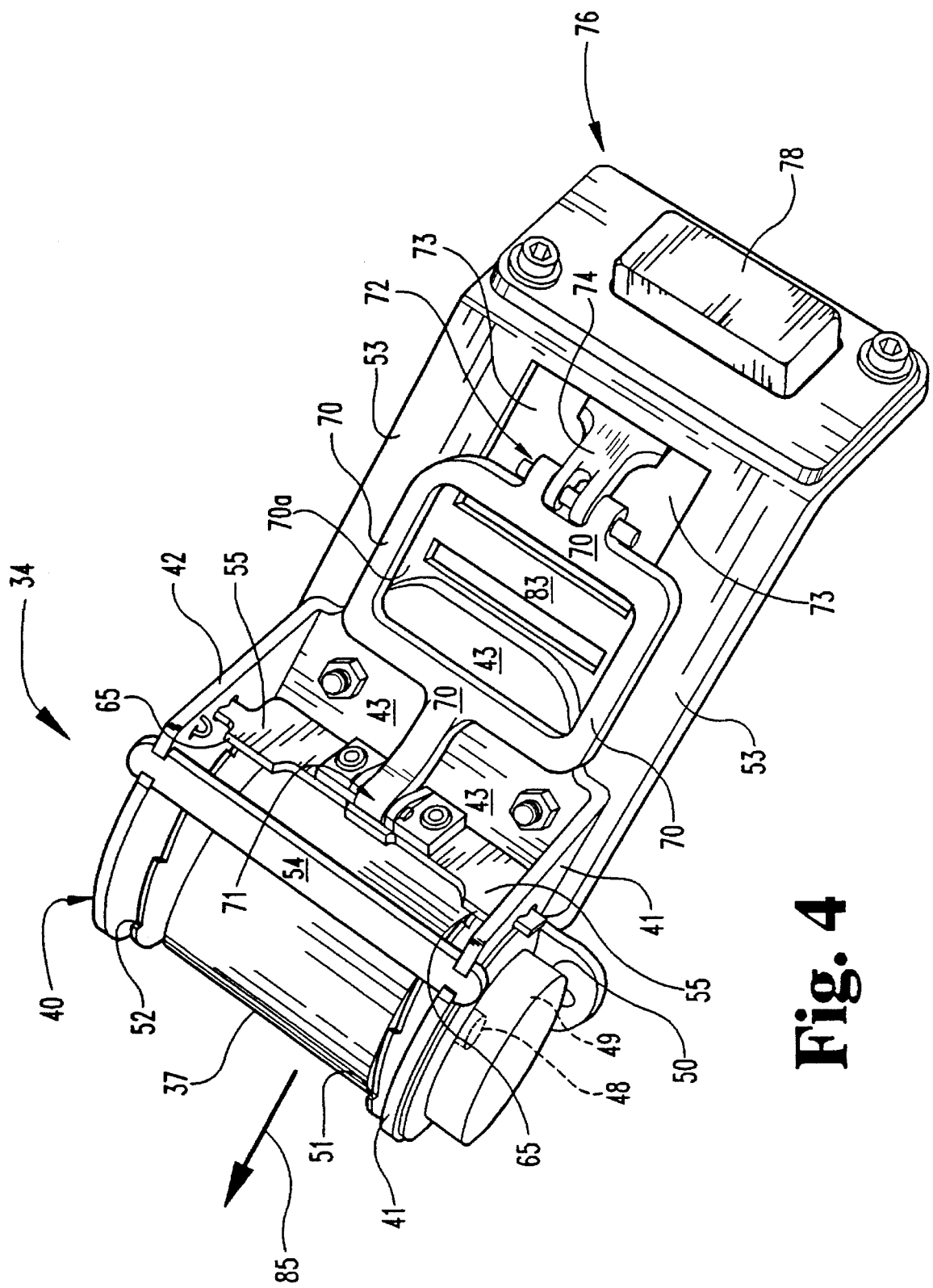

CABLE ACTIVATED HARNESS RETRACTOR FOR CHILD SEAT

CROSS-REFERENCE TO RELATED APPLICATION

This application is a continuation-in-part of U.S. patent application Ser. No. 08/014,111, filed Feb. 5, 1993 and entitled BELT RETRACTOR WITH PUSH BUTTON CONTROLLED LOCKING BAR. The U.S. patent application Ser. No. 08/014,111 now U.S. Pat. No. 5,380,066 is a continuation-in-part of now abandoned U.S. patent application Ser. No. 07/897,872 filed Jun. 12, 1992.

BACKGROUND OF THE INVENTION

This invention is in the field of retractors typically used for seat belts.

DESCRIPTION OF THE PRIOR ART

Many patents have been granted that disclose automatic belt retracting devices, which include a spring biased spool normally withdraw the belt into the retractor, but yieldable to allow the belt to be withdrawn therefrom and attached at the opposite end to a buckle or tongue. Typically, the prior art spools include a ratchet configured end plate that is lockingly engaged by a spring biased locking bar pivotally mounted to the retractor frame. Many of the prior art retractors have means for automatically holding the locking bar out of the locking position until a sufficient amount of belt has been withdrawn from the retractor. One such approach has been to provide a belt follower engaged with the bar that will hold the bar out of position until a sufficient amount of belt has unwrapped from the spool. Another approach is to provide a gearing mechanism or cam plate that holds the bar away from the locking position until the spool has rotated to a predetermined angle. The various mechanisms, including the cam plate, hold the locking bar out of the locking position until the retractor spool is slightly rewound. Once the locking bar is allowed to pivot into a locking position, the retractor is operable to prevent further withdrawal of the belt from the retractor. Thus, if the desired or necessary amount of belt is not withdrawn from the retractor prior to attaching the opposite end of the belt to a tongue or a buckle, and if the spool is allowed to slightly rewind, the retractor will automatically lock, preventing further belt withdrawal and possibly attachment of the belt to the tongue or buckle. In such a case, the belt must be completely rewound onto the retractor spool, resulting in considerable inconvenience to the user.

Disclosed in U.S. Pat. No. 4,720,148 is a mechanism for deactivating the cam plate and locking bar of a child seat retractor until the tongue attached to the opposite end of the belt is inserted into a buckle, whereupon the cam plate is released, allowing the locking bar to lockingly engage the retractor spool. It is also known to provide a locking bar which engages the ratchet spool only when the tongue and buckle are interengaged, such as shown in U.S. Pat. No. 3,915,402, or to provide a mechanism to contact and normally hold the locking bar in the removed position until the tongue is inserted into the buckle. Such a known mechanism includes a spring biased lever pivotally mounted to the retractor frame independent of the cam plate or ratchet spool and movable away from the locking bar which will then engage the ratchet wheel once the tongue and buckle are interengaged. Likewise, alternative design approaches have been suggested that include rotating the cam plate or to provide a non-automatic manual lever for independent operation of the cam plate.

It is also known to provide a child seat for mounting atop an automobile seat with the child seat having a harness for securing a child therein, such as shown in U.S. Pat. Nos. 4,025,111; 4,342,483; and 4,720,148. It is also known to provide on a child seat a retractor with the aforementioned mechanism for directly contacting and holding the locking bar for the controlled withdrawal of the child seat harness.

The retractor disclosed herein incorporates an actuator into the locking arrangement of a buckle and tongue to control the movement of a locking bar. In one version, the actuator is contained inside the buckle and is activated by the insertion of a buckle tongue therein. A second version integrates the actuator into the seat assembly adjacent to the buckle tongue and the actuator is activated when the buckle housing contacts the actuator. A number of prior patents disclose retractors having cables for the operations thereof. In U.S. Pat. No. 3,294,447 issued to Riley, a cable has one end moved by a tongue inserted into a buckle wherein the opposite end of the cable is connected to a pawl to move the pawl into and out of engagement with the retractor spool. The pawl remains locked with the ratchet wheel so long as the tongue is inserted into the buckle. A similar device is disclosed in the British patent specification 1311978 issued to Barnes. Even with a variety of earlier designs, there remains a need for a retractor having an actuator integrated into the buckle and tongue combination. The present invention satisfies this need in a novel and unobvious way.

SUMMARY OF THE INVENTION

To address the unmet needs of prior retractors, the present invention contemplates a retractor for mounting to a child seat having a harness and an interengaged combination of a tongue and seat buckle comprising: a frame; a spool to wrappingly receive a portion of the harness and having an axle and end walls, at least one of which is configured as a ratchet wheel with the spool rotatably mounted to the frame; a first spring mounted to the frame and normally urging the spool to rotate to a retracted position whereat a portion of the harness is wrapped thereon; a locking bar parallel to the axle and mounted to the frame to be movable between a normal removed position whereat the locking bar is located apart from the ratchet wheel and a locking position whereat the locking bar lockingly engages the ratchet wheel limiting movement of the spool; a cable having a first end attached to the locking bar and further having an opposite second end, the cable movable from a first position whereat the locking bar is in the removed position to a second position whereat the cable moves the locking bar to the locking position; and an actuator mounted to the child seat and connected to the second end of the cable, the actuator including a movable member and operable upon movement of the movable member to move the cable to the second position, the cable being movable to the first position when the member is released.

Another embodiment of the present invention is a child seat harness for installation in an automobile comprising: a child seat configured to receive a child; a harness mounted to the child seat and extendable over the child to secure the child within the child seat; an interengaged combination tongue and seat belt buckle mounted to the child seat and interlockable with the harness; at least one retractor, the retractor including a frame, a spool to wrappingly receive a portion of the harness and having an axle and end walls at least one of which is configured as a ratchet wheel with the spool rotatably mounted to the frame, a first spring mounted to the frame and normally urging the spool to rotate to a retracted position whereat the harness is wrapped thereon, a locking bar mounted to the frame and movable between a removed position whereat the locking bar is disengaged from the ratchet wheel and a locking position whereat the locking bar positively engages the ratchet wheel thereby limiting the spool from rotating to the retracted position; and at least one actuator mounted to the child seat and connected to the locking bar, the actuator being movable from a first position whereat the locking bar is in the removed position, to a second position whereat the actuator moves the locking bar to and holds the locking bar in the locked position until released, the actuator includes a cable to move the locking bar.

It is an object of the present invention to provide a new and improved means for activating a belt retractor's locking bar.

A further object of the present invention is to provide an improved child seat with harness incorporating a belt retractor with means for actuating the locking bar of the retractor when the tongue and buckle are lockingly engaged.

Related objects and advantages of the present invention will be apparent from the following description.

BRIEF DESCRIPTION OF THE DRAWINGS

FIG. 3 is a rear view of the seat of FIG. 1.

FIG. 4 is an enlarged perspective view of an alternate embodiment of the new improved retractor disclosed herein.

DESCRIPTION OF THE PREFERRED EMBODIMENTS

Figure 1:
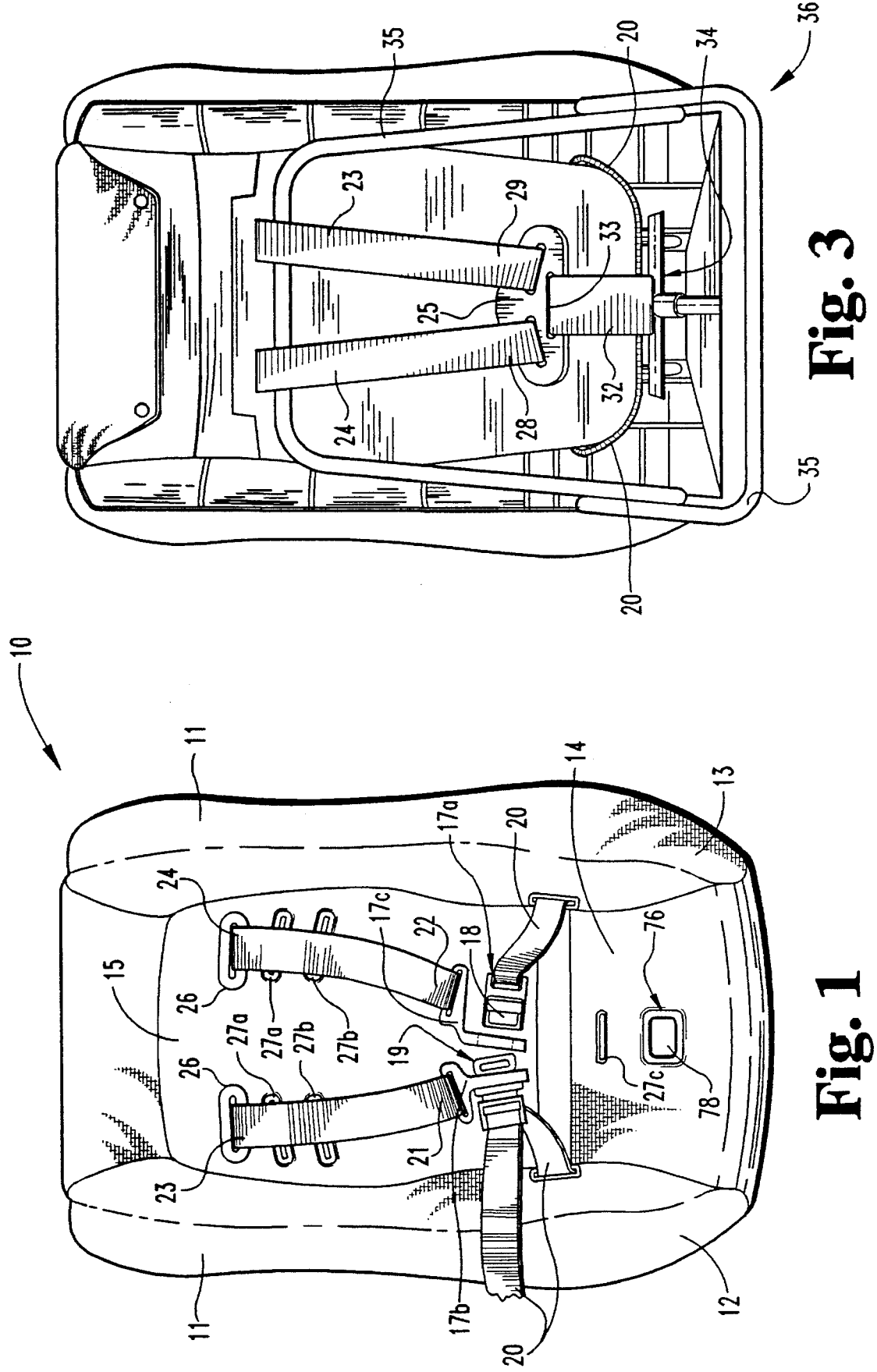
FIG. 1 is a front view of a child seat incorporating an alternate embodiment of the new and improved retractor disclosed herein.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, in FIG. 1 there is shown a child seat 10, which includes an outer frame 11 having a pair of downwardly extending arms 12 and 13, with a cushioned seat area 14 and a cushioned back supporting area 15 located therebetween. A plurality of conventional tubing 35 forms a rear frame 36, which is adjustable to support the child seat 10 at a proper angle upon an automobile seat. Tubing 35 may be utilized to secure the child seat 10 to an automobile seat by any suitable means such as by extending the automobile seat belts securely around tubing 35. In the seat area 14 there is provided a seat belt buckle 17a of conventional construction. The push button 18 of buckle 17a faces outwardly allowing the child seat user to depress the same to release an elongated buckle tongue 19, which is shown released from the buckle 17a in FIG. 1. The buckle 17a is fixedly secured to belt 20, which extends through the downwardly extending arm 13 of seat 10, across the under side of seat 10 (FIGS. 2 and 3), and exits on the opposite side of the seat 10 through downwardly extending arm 12, where belt 20 is adjustably affixed to buckle tongue 19 by conventional means. Belt 20 functions as a lap belt.

The elongated tongue 19 also engages buckle members 17b and 17c by extending therethrough, before becoming lockingly engaged with buckle 17a. Buckle members 17b and 17c are removably secured to ends 21 and 22, respectively, of harness belts 23 and 24, each of which extend through the back supporting area 15 of seat 10 and then down the rear side of seat 10 (FIG. 3) to a belt connector or bar 25. Multiple pairs of through slots 26 and 27a and 27b are provided in back supporting area 15 of seat 10. Belts 21 and 22 are led either through the pair of slots 26 or through either of the pair of slots 27a or 27b, depending upon the size of the child to be placed in the seat 10. The belts 23 and 24 are extended through the upper pair of slots 26 if a large child is to be supported, or through either of the lower pair of slots 27a or 27b if a smaller child is to be supported.

The belt, buckle system and seat as described above are conventional and are currently available in the marketplace from a variety of sources. The present invention is the improved retractor to be disclosed herein.

Figure 6:
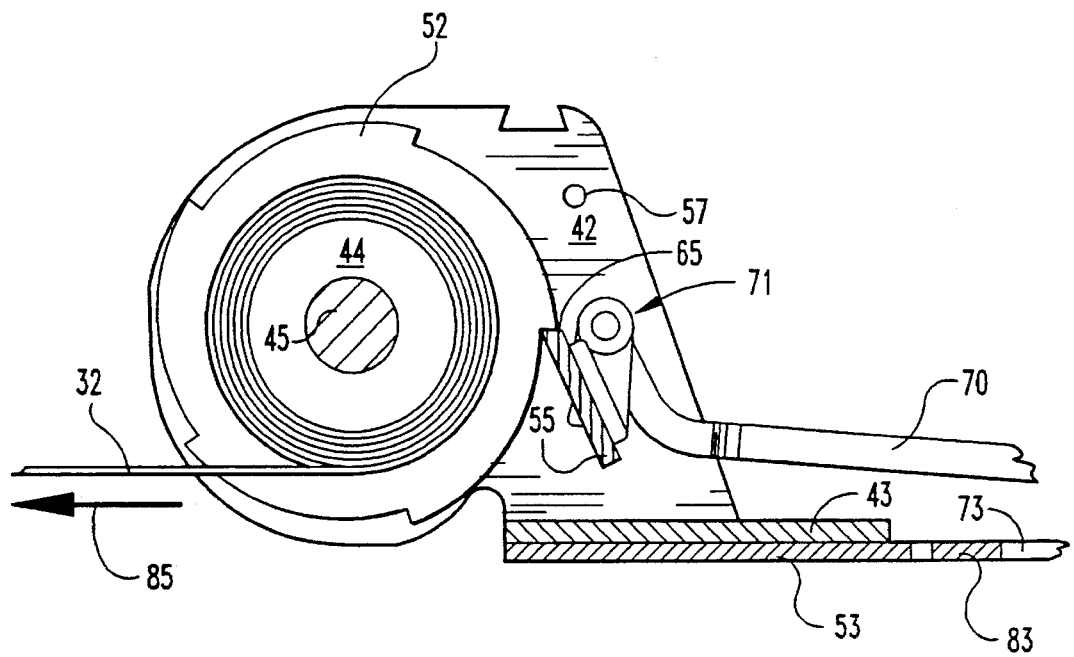
FIG. 6 is an enlarged fragmentary left side view of the retractor of FIG. 4 and showing the ratchet wheel and the spring biased locking bar in the normal locking position, limiting withdrawal of belt material from the retractor's spool.
Figure 7:
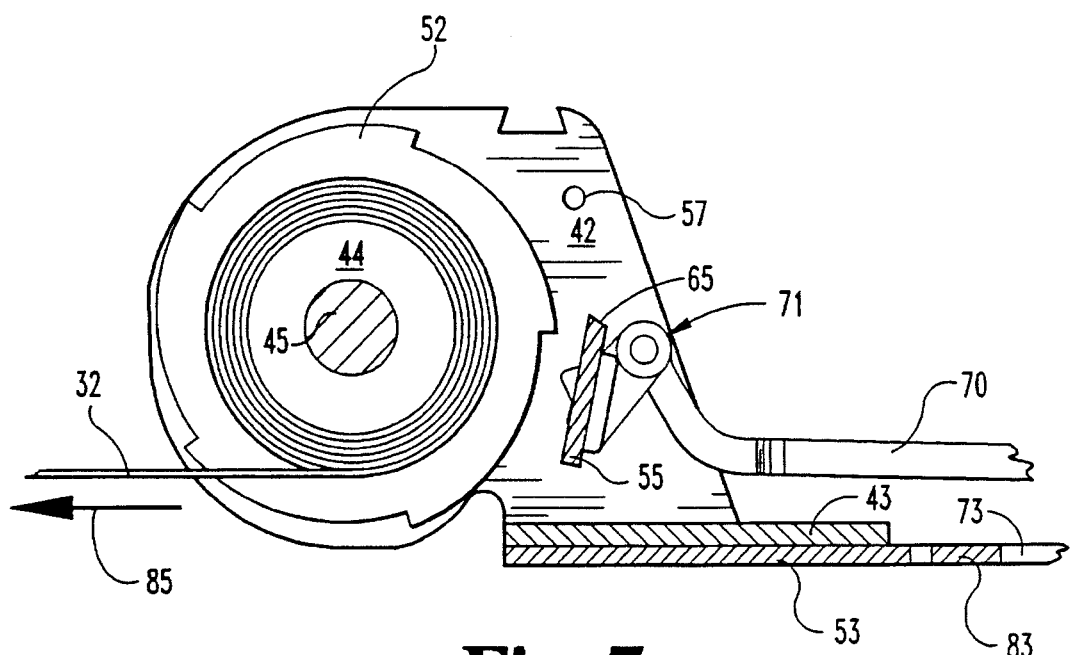
FIG. 7 is the same view of FIG. 4 only showing the spring biased locking bar in the removed position, freeing the retractor's spool to allow withdrawal of belt material.

Referring now to FIG. 3, a third belt 32 has a distal end 33 fixedly secured to belt connector 25, with the proximal end of belt 32 being wrappingly mounted on a spool 44 (FIGS. 6 and 7) of a belt retractor 34 of the present invention.

Figure 8:
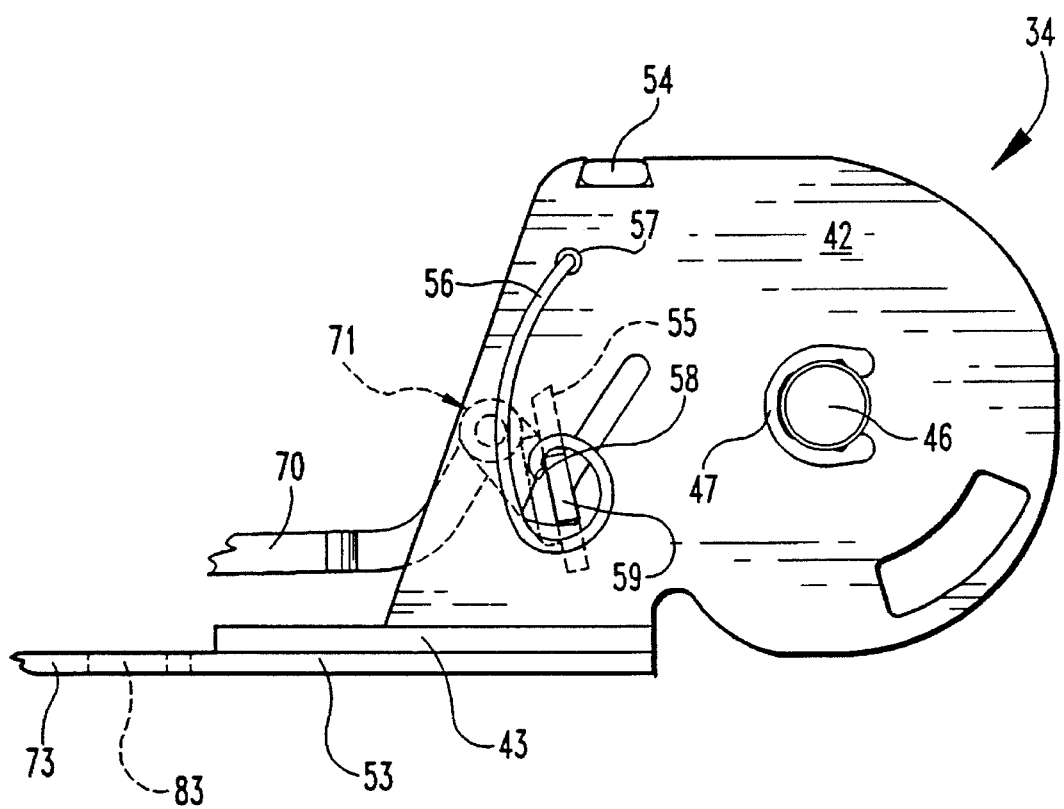
FIG. 8 is an enlarged fragmentary right side view of the retractor FIG. 4.

Referring now to FIG. 4, retractor 34 of the alternate embodiment includes a U-shaped frame 40 having a pair of spaced apart side walls 41 and 42 that are integrally joined together by a bottom wall 43. An additional cross member 54 (FIG. 4) extends between and secures the side walls 41 and 42 of the retractor frame together. A retractor spool 44 (FIGS. 6 and 7) is rotatably mounted to and between side walls 41 and 42, and includes an axle 45 extending through the side walls 41 and 42 with one outer end 46 (FIG. 8) secured to side wall 42 by means of a conventional spring biased C-clamp 47, extending into a circumferentially extending groove provided in end 46. The opposite end 48 of axle 45 extends through side wall 41 and is attached to a helical spring 49 provided within cover 50. The helical spring is operable to urge the axle to rotate and withdraw belt 32 onto spool 44 of the retractor 34, but is yieldable to allow for the withdrawal of the belt 32 from spool 44 in direction of arrow 85.

A pair of ratchet shaped end plates 51 and 52 are fixedly attached to axle 45 immediately inward of side walls 41 and 42, and plates 51 and 52 rotate with the axle 45 as belt 32 is pulled from or withdrawn onto the spool 44 of the retractor 34. A spring biased locking bar 55 has opposite ends which extend through side walls 41 and 42 and is pivotable from a locking position (FIG. 6) in which the locking bar 55 engages the ratchet shaped end plates 51 and 52 of the spool 44 thereby restricting the movement of the spool 44, to a removed position (FIG. 7) in which the locking bar is freed from its locking engagement with ratchet end plates 51 and 52, allowing spool 44 to rotate to permit belt 32 to be withdrawn from spool 44. A wire spring 56 (FIG. 8) has one end 57 attached to side wall 42 and an opposite end 58 attached to the outer end 59 of locking bar 55 with the wire spring 56 being operable to normally force locking bar 55 into the locking position and thus into engagement with the ratchet shaped end plates 51 and 52, such that end 65 of the locking bar 55 (FIGS. 6 and 7) may enter into contact with and block further withdrawal of belt 32 from the spool 44.

The retractor as described with a locking bar and ratchet shaped end plates associated with the retractor spool is conventional in nature, but notably absent is a cam plate or clutch plate to automatically control the disposition of the locking bar. The improvement of the present invention includes pivotally mounting an operator member 70 (FIG. 4) to the locking bar 55 that is manually and selectively operable by manual push button control means to move the locking bar 55 from its normal locking position (FIG. 6) against the bias of wire spring 56 to a removed position (FIG. 7) and to hold the locking bar 55 in the removed position until the belt and harness system of the child seat is adjusted. When the locking bar 55 is released by the push button control means locking bar 55 is forced to pivot to the locking position under the influence of wire spring 56 thereby allowing the locking bar to move into a locking position with respect to ratchet shaped end plates 51 and 52, preventing further withdrawal of belt 32 from the retractor spool 44.

Figure 2:
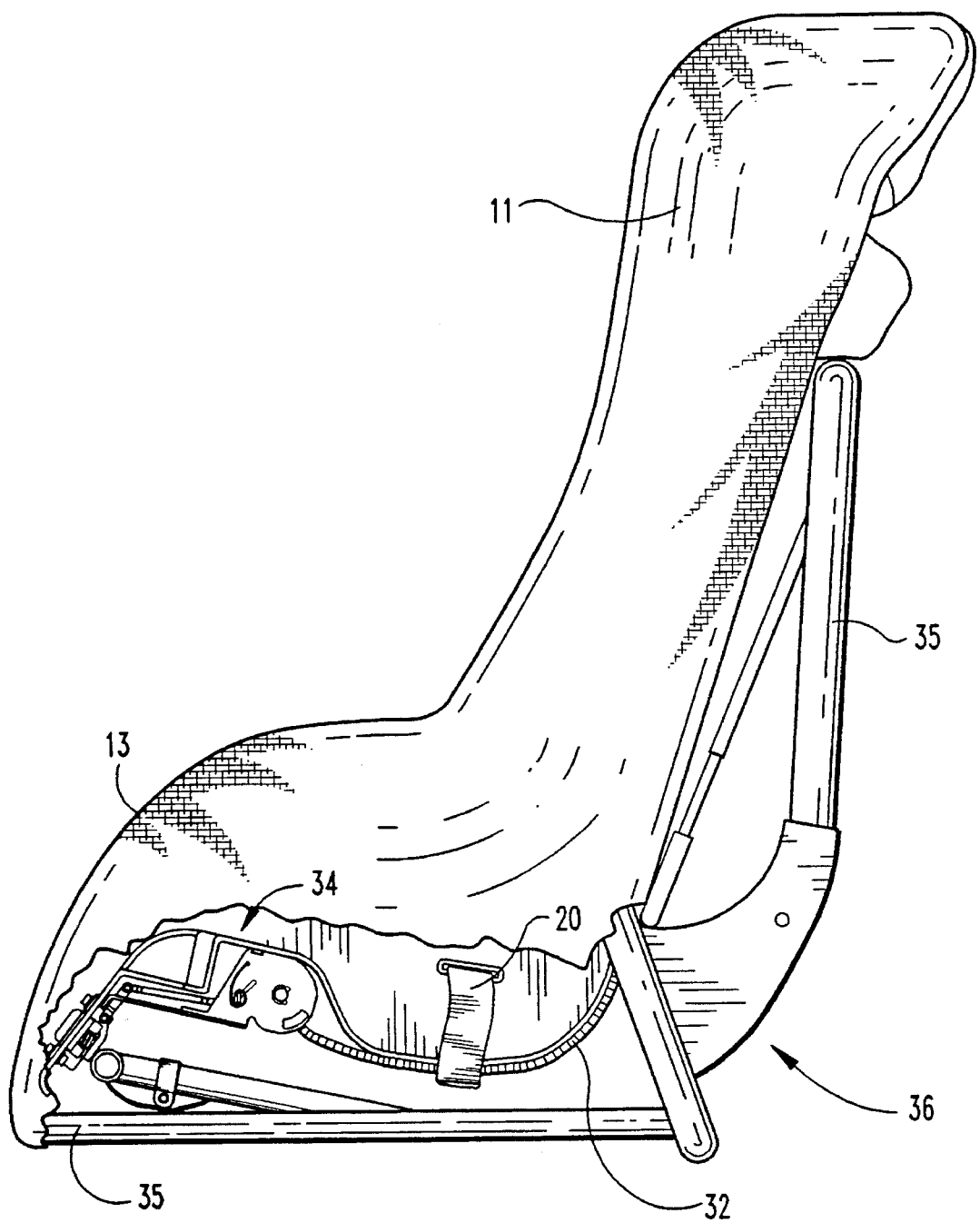
FIG. 2 is a fragmentary left side view of the seat of FIG. 1.
Figure 5:
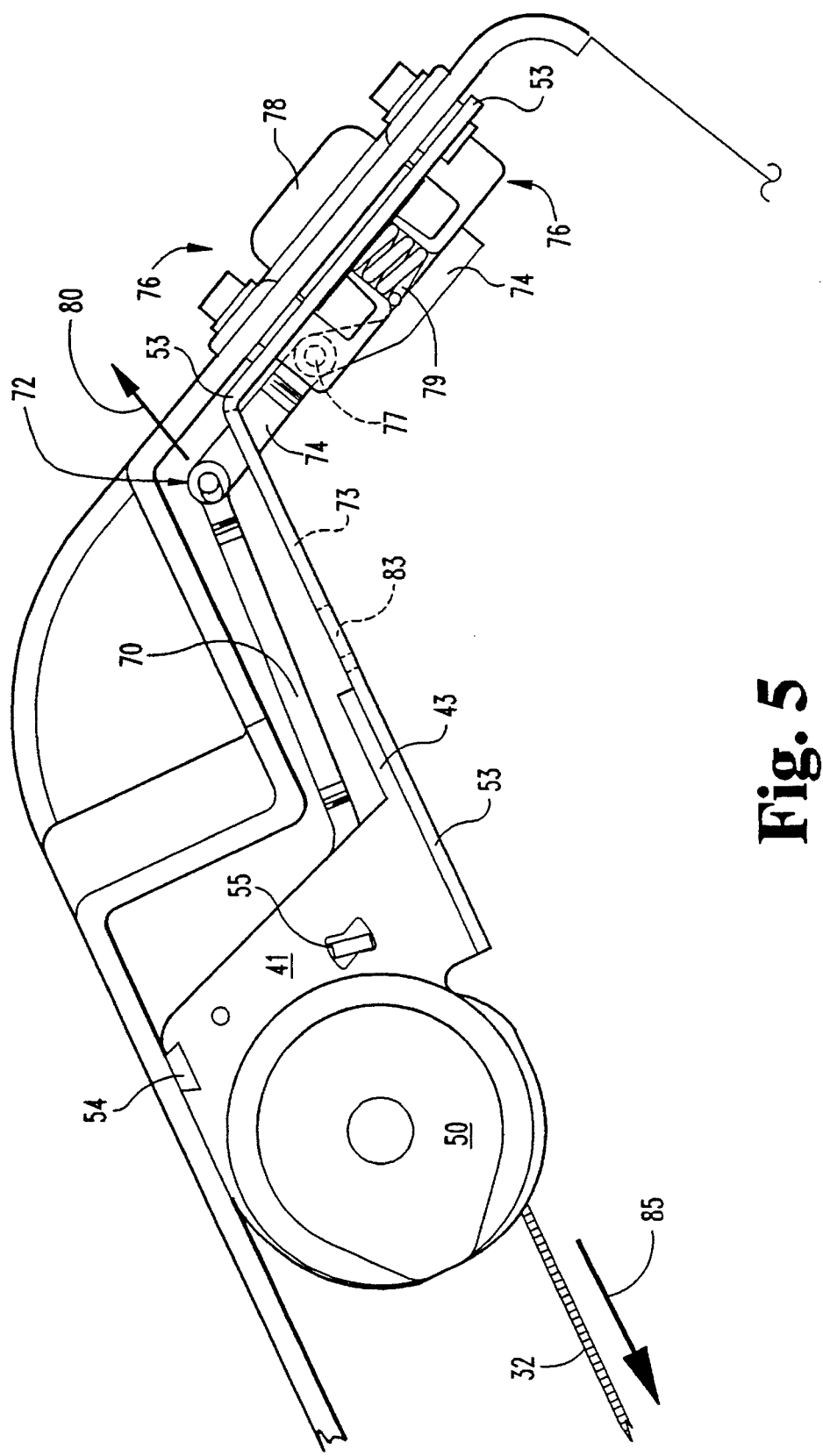
FIG. 5 is an enlarged left side view of the retractor of FIG. 4 shown mounted to the bottom of a child seat.

Referring now to FIG. 4, bottom wall 43 of retractor 34 is joined to an L-shaped base member 53 (FIG.4) by which retractor 34 becomes secured to the frame 11 of the seat 10 with the retractor 34 being positioned beneath or adjacent the under side of the seat 10 (FIGS. 2 and 5). Operator member 70 includes ends 71 and 72. End 71 is pivotally attached to locking bar 55. End 72 extends in the opposite direction to a point above an opening 73 provided through base member 53, where end 72 of operator 70 is pivotally connected to a button lever 74 (FIG. 5). Button lever 74 extends downwardly through opening 73, and is pivotally attached at a pivot point 77 to a push button housing 76, which houses a spring biased push button 78. Push button housing 76 is mounted through an opening in base member 53 located at the end thereof opposite retractor 34. A helical spring 79 biases push button 78 in an up position. When push button 78 is manually depressed, as shown in FIG. 5, button 78 contacts button lever on its end opposite its connection with end 72 of operator 70 causing button lever 74 to pivot about pivot point 77, and causing end 72 of base member 53 to move generally in the direction of arrow 80. This movement of end 72 of base member 53, in turn, moves end 71 of operator member 70, which pivots locking bar 55 against the spring bias of wire spring 56 and from the locking bar's locking engagement with ratchet shaped end plates 51 and 52 (FIG. 6), which is the locking position, to the removed position (FIG. 7), which allows free withdrawal of belt 32 from spool 44. When push button 78 is manually released, it is biased to an up position by helical spring 79, and the locking bar 55 is pivoted to the locking position (FIG. 6) under the spring bias of wire spring 56 with operator 70 and button lever 74 following suit.

Referring to FIGS. 1 and 2, L-shaped base member 53 allows push button housing 76 and push button 78 to be situated forward in the seat area 14 of child seat 10 where it extends through the seat area 14 through a suitable sized opening so as to be readily accessible to the user.

In an alternative embodiment of seat 10, a fifth belt (not shown) may be added by anchoring one end to cross member 53 of base member at tab 83 (FIG. 4), and by leading the other end, fitted with a buckle member complementary with buckle members 17b and 17c and to be similarly received by tongue 19 through a suitable opening 70a provided in operator 70, and then up through slot 27c in seat area 14.

The retractor 34 disclosed herein includes a spring biased spool 44 which wrappingly receives belt 32 and normally urges the belt 32 to a retracted condition, but which is yieldable to allow withdrawal 32. The locking bar 55 of retractor 34 is normally engaged with the ratchet shaped end plates 51 and 52 of the retractor to limit rotation of the spool 44 and withdrawal of the belt 34. When push button 78 is depressed, locking bar 55 is manually pivoted to a removed position in which spool 44 is freed from its locking engagement with locking bar 55, and belt 32 may be freely withdrawn from spool 44. Thus, the user may push button 78 and freely adjust the belt system connected to belt 32 until such time as the proper adjustments have been made, and then simply release button 78 to lock the retractor.

Figure 10:
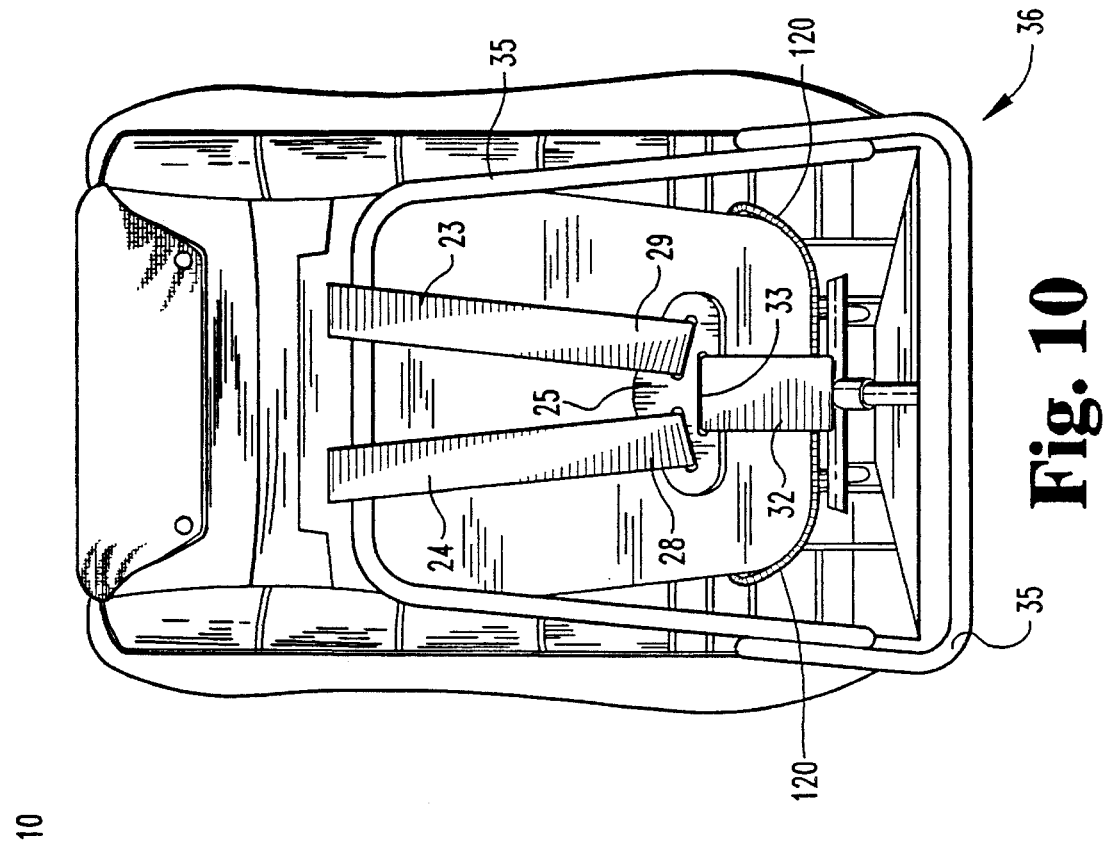
FIG. 10 is rear view of the seat of FIG. 9.
Figure 9:
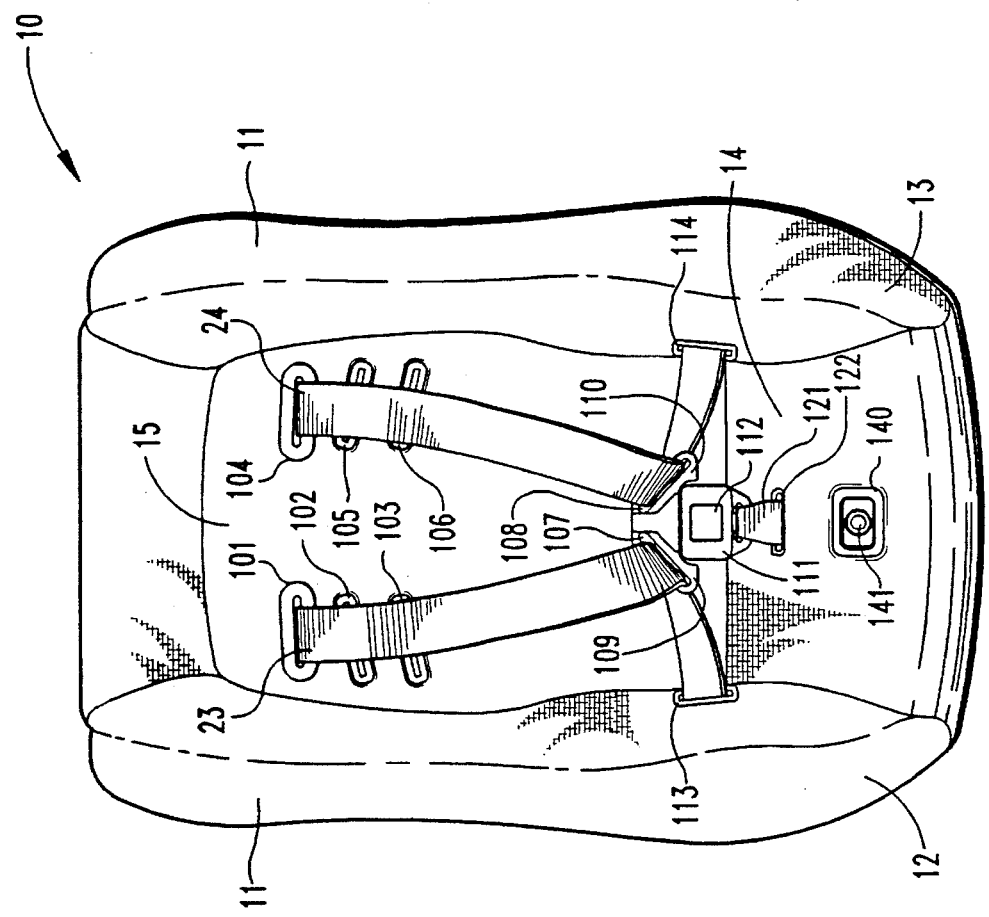
FIG. 9 is a front view of a child seat incorporating the alternate embodiment of the new and improved
Figure 11:
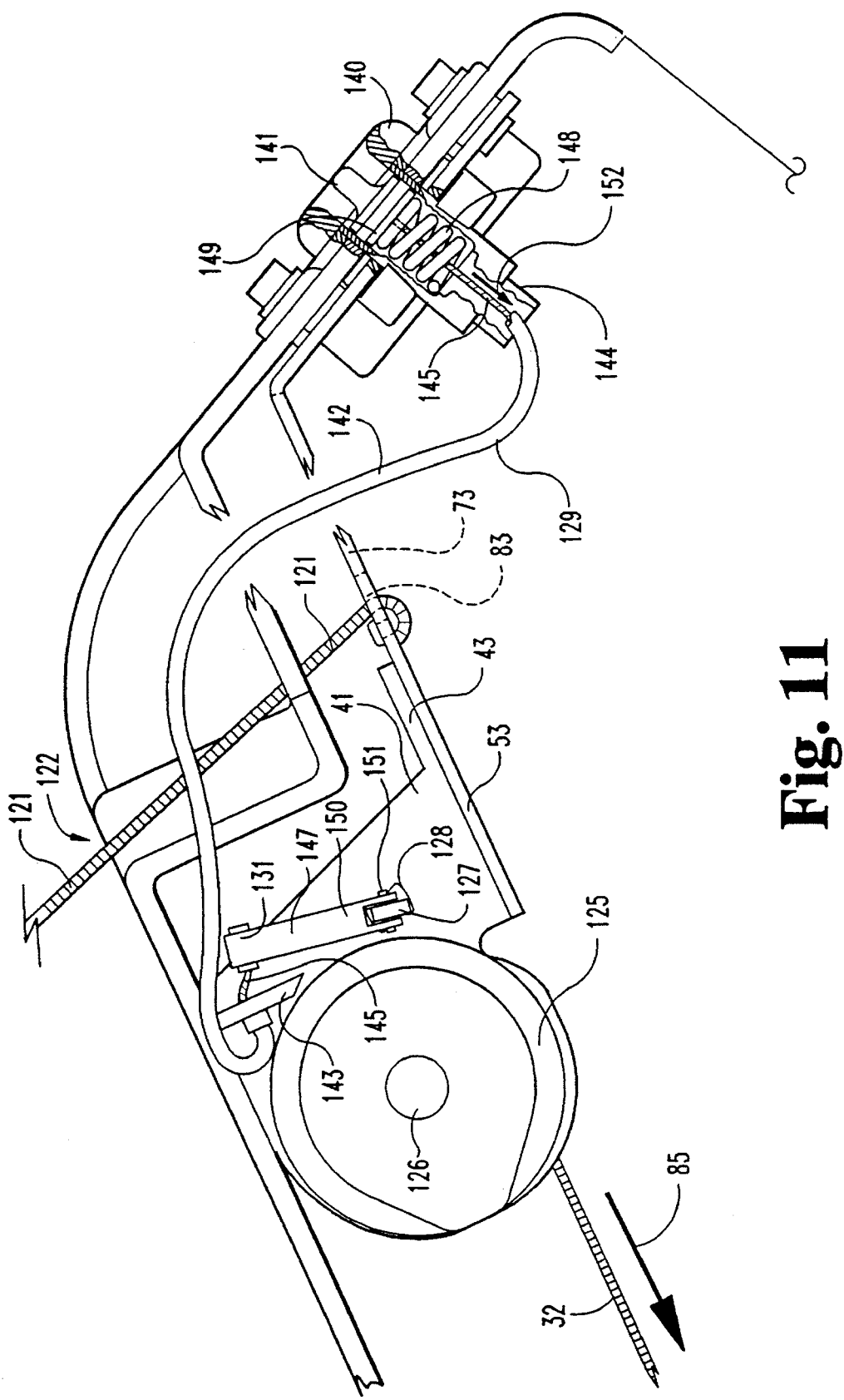
FIG. 11 is a fragmentary enlarged left side view of the retractor mounted to the bottom of the child seat of FIG. 9.

An alternate embodiment of the belt retractor with push button controlled locking bar is shown in FIGS. 9–11. Seat 10 is identical to the seat previously described and thus has an outer frame 11 with a pair of downwardly extending arms 12 and 13, with a cushion seat area 14 and cushion back supporting area 15 located therebetween. The cushion back supporting area 15 includes a first set of slots 101–103 and a second set of slots 104–106. Belts 23 and 24 have first ends 29 and 28 (FIG. 10) secured to a conventional T-bar or belt connector 25 with the belts then extending each through a slot formed in back supporting area 15. In the embodiment shown in FIG. 9, belts 23 and 24 extend slidably through slots 101 and 104 which are arranged to accommodate a large size child as compared to accommodating a small size child when the belts extend through slots 103 and 106.

Belts 23 and 24 extend slidably respectively through slots 107 and 108 of tongues 109 and 110, in turn, having tongue blades releasably lockable with buckle 111. Tongues 109 and 110 are identical to the buckle tongues disclosed in the commonly owned U.S. Pat. No. 5,023,981. Likewise, buckle 11 is identical to the buckle disclosed in the commonly owned U.S. Pat. No. 5,023,981 which is herewith incorporated by reference. Buckle 11 is provided with a push button 112 to allow the user to unlock the buckle relative to tongues 109 and 110. Once belts 23 and 24 extend through slots 107 and 108, the belts then diverge and extend through a pair of apertures 113 and 114 formed in the sides of arms 12 and 13. Belts 23 and 24 are integrally joined together by intermediate portion 120 (FIG. 10) which extends across the bottom of the seat. Thus, belts 23 and 24 are joined together in a single belt configuration extending across the bottom of the seat and then through slots 113 and 114, passing through slots 107 and 108 of tongues 109 and 110 and then through the pair of slots 101 and 104 ultimately being connected to belt connector 25. Belts 23 and 24 are joined to belt connector 25 in such a fashion to allow the belts to be removed from the belt connector in the event the belts are to be changed and extended through either slots 102 and 105 or slots 103 and 106.

Buckle 111 is attached to web 121 extending through slot 122 formed in the cushion seat area 14. The opposite end of belt 121 is fixedly attached to tab 83 (FIG. 11) of cross member 53 fixedly attached to the seat frame 35.

Belt 32 (FIG. 10) has a distal end 33 fixedly secured to belt connector 25 with tile proximal end of belt 32 wrappingly mounted on a spool of a retractor as previously described and shown in FIG. 4. Retractor 125 (FIG. 11) is mounted to and beneath the seat shown in FIG. 9 and is identical to retractor 34 previously described with the exception that retractor 125 does not include the wire spring 56 (FIG. 8) nor the linkage 70. Instead linkage 70 has been replaced by a cable 129 (FIG. 11) which extends from button 140 to lever 131.

Retractor 125 is conventional in nature in that it has a retractor spool having an axle 126 rotatably mounted to and between a pair of sidewalls in a manner identical to that described for retractor 34. One end of axle 126 is secured to the retractor frame sidewall by means of a C-shaped clamp whereas the opposite end of the axle extends through the remaining retractor frame sidewall and is connected to a coiled spring to urge retraction of belt 32 which is wound on the retractor spool. The spring engaging axle 126 is yieldable to allow extension of web 32 in the direction of arrow 85 with the opposite end 33 (FIG. 10) of web 32 being fixedly attached to belt connector 25.

The spool of retractor 125 includes a pair of ratchet shaped end plates 51 and 52 (FIG. 4) with web 32 extending therebetween. Likewise, retractor 125 includes a locking bar 127 identical to locking bar 55 which is parallel to the spool axle. Bar 127 engages the ratchet shaped end plates of the spool thereby restricting the movement of the spool and preventing web movement. The opposite ends of locking bar 127 are received in a pair of apertures formed in the retractor sidewalls to allow the locking bar to pivot to and from the ratchet shaped flanges of the spool. For example, ratchet sidewall 41 is provided with aperture 128 through which locking bar 127 projects. Thus, retractor 125 operates in an identical manner to retractor 34 except that movement of locking bar 127 is controlled by cable 129 and does not include the operator member 70 and spring 56.

Cable 129 includes an outer housing 142 extending between and attached to wall 143 of cross member 53 and to button housing 144 also mounted to cross member 53. Wire 145 extends through and is slidable within housing 142 with one end 146 of wire 145 fixedly attached to the top end 147 of lever 131 with the opposite end of the wire extending through spring 148 and attached to plate 149. Plate 149 is spaced apart from the interior end of button 141 of the push button operator 140 mounted to the forward portion of the cushioned seat area 14. Helical spring 148 is contained within housing 144 and is operable to normally urge plate 149 and wire 145 toward button 141.

One end 150 of lever 131 is bifurcated and extends along the opposite sides of locking bar 127. Pen 151 extends through the bifurcated end of lever 150 and the upper portion of locking bar 127. Thus, by depressing button 141, the button is caused to contact and move plate 149 and wire 145 in the direction of arrow 152 thereby moving lever 131 and locking bar 127 in a clockwise direction as viewed in FIG. 11 causing the locking bar to move apart from the ratchet shaped flanges of the web spool allowing the spool to freely rotate and to retract web 32 under the pressure of the spring force applied to the spool axle or to allow the web to be withdrawn in the direction of arrow 85 in the event withdrawal pressure is greater than the spring retraction pressure. By continuing to depress button 141, web 32 along with belts 23 and 24 may be adjusted to extend over the occupant of the child seat. By removing finger pressure from button 141, helical spring 148 is operable to move plate 149 and wire 145 in a direction opposite of arrow 152 thereby pivoting lever 131 and locking bar 127 in a counterclockwise direction, as viewed in FIG. 11, thereby causing the locking bar to lockingly engage the ratchet shaped flanges of the web spool preventing further withdrawal or extension of web 32 relative to the retractor until button 141 is again depressed. Housing 144 is fragmented to illustrate the construction of the spring 148, plate 149 and wire 145. Likewise, it is to be understood cable 142 extends through the various frame members as the cable extends from the push button towards the retractor.

Many variations are contemplated and included in the present invention of FIG. 11. For example, wire 146 is shown as connected to lever 131, in turn, mounted to one end of locking bar 127. An alternate means of connection is to connect cable 146 to an extension, in turn, mounted to the locking bar equi-distant between the ends of the locking bar. Likewise, in lieu of locating a spring at the end of the wire adjacent button 141, the same result may be obtained by locating a spring near the opposite end of the wire adjacent locking bar 127, it being understood that the desired objective is to apply spring pressure to the wire to normally cause the locking bar to lockingly engage the spool ratchet flanges when finger pressure is not applied to button 141. Further, in lieu of utilizing a button 141, the same result may be obtained by replacing the button by a lever pivotally mounted to engage plate 149 in an identical manner.

Figure 12:
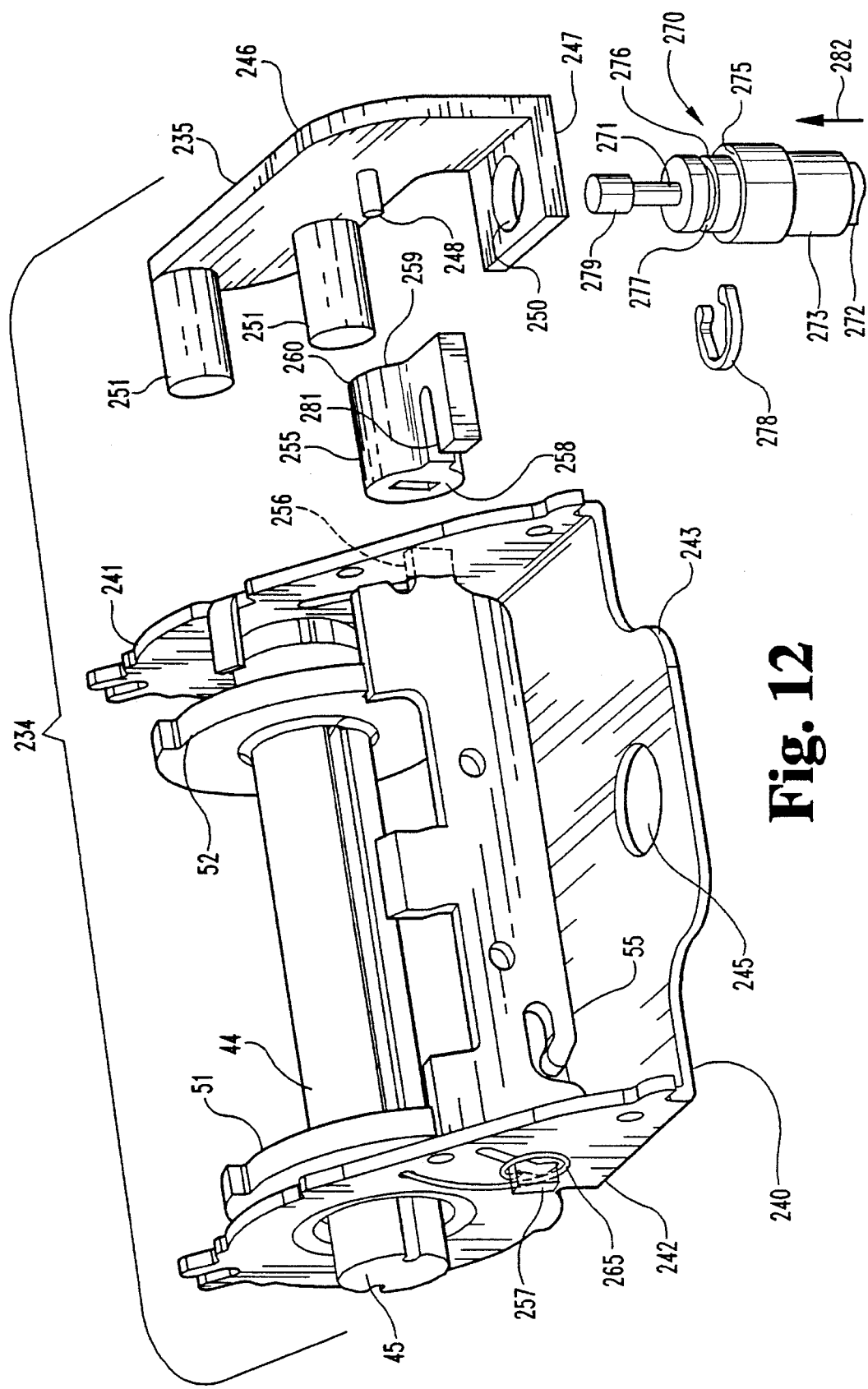
FIG. 12 is an enlarged partially exploded perspective view of the preferred embodiment of the new and improved retractor.

The preferred embodiment of the present invention is illustrated in FIG. 12, where a retractor, item 34 in FIG. 4, is now item 234. The retractor 234 is essentially identical to retractor 34 previously disclosed with a few modifications. Referring to FIG. 12, there is illustrated the retractor 234 which includes a cable mounting bracket 235, and a U-shaped frame 240 having a pair of spaced apart sidewalls 241 and 242 that are integrally joined by a bottom wall 243. Bottom wall 243 includes a clearance hole 245 substantially centrally located between the sidewalls 241 and 242.

The cable mounting bracket 235 is of unitary construction and can be viewed or thought of as having two portions; an attachment portion 246, and a cable mounting flange portion 247. The attachment portion 246 includes a pivot pin 248 projecting substantially perpendicular, from the mounting bracket, towards the sidewall 241. The cable mounting flange portion 247 is parallel to the bottom wall 243 of the U-shaped frame 240 and is formed perpendicular to the attachment portion 246. Further, a substantially centrally located clearance hole 250 is formed in the cable mounting flange portion 247. A pair of spacers 251 hold tile cable mounting bracket 235 in a spaced apart relationship with tile sidewall 241. The spacers 251 are attached securely to the sidewall 241 and the mounting bracket 235 by a conventional fastening technique, such as riveting, bolting, or welding.

A pivot attachment arm 255 is disposed between the sidewall 241 and the mounting bracket 235. A spring biased locking bar 55 has a first end 256 that extends through the sidewall 241 and a second end 257 that extends through the sidewall 242. A first end 258 of the pivot attachment arm 255 is securely connected to the first end 256 of the locking bar 55. The second opposite end 259 of the pivot attachment arm 255 includes a bore 260, with pivot pin 248 receivable therein. Pivot pin 248 and the bore 260 are respectively sized such that there is sufficient clearance between them to allow the pivot attachment arm 255 to rotate freely on pivot pin 248. In an alternate embodiment (not illustrated) a pivot pin is formed on the second end 259 of pivot attachment arm 255, and a corresponding bore is formed in the mounting bracket 235.

Figure 13:
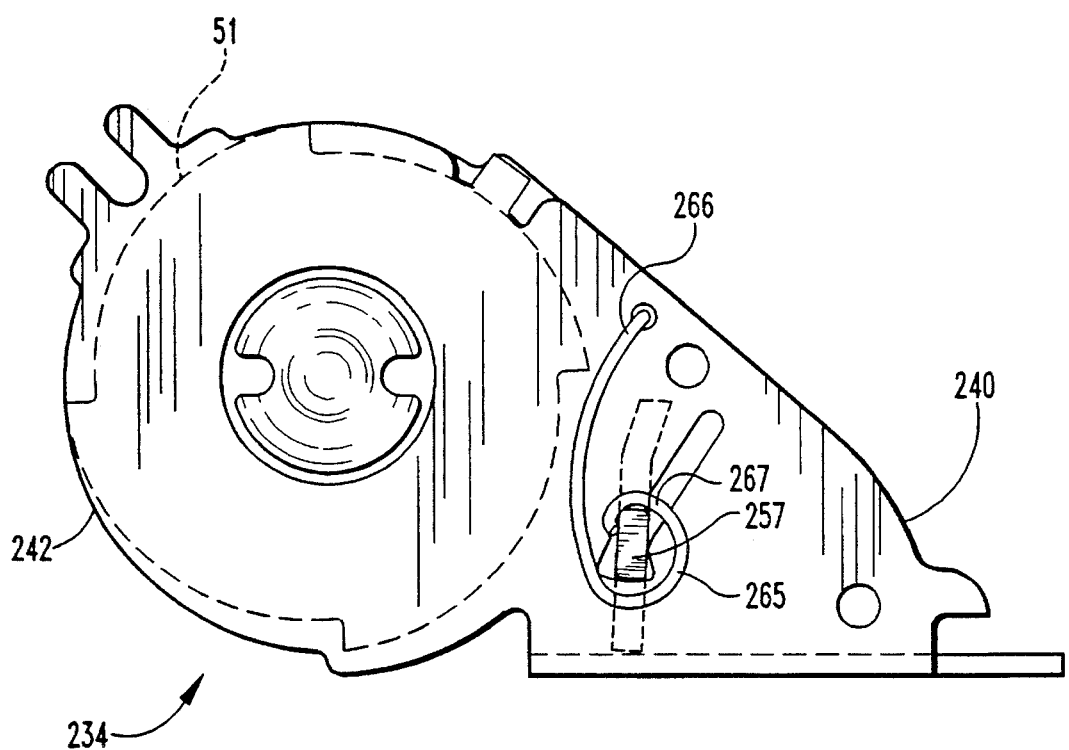
FIG. 13 is a fragmentary left side view of the retractor of FIG. 12 and showing the ratchet wheel and the spring biased locking bar in the normal unlocked position.

Referring now to FIG. 13, there is illustrated a wire spring 265 with one end 266 attached to the sidewall 242 of the U-shaped frame 240, and an opposite end 267 attached to the second end 257 of locking bar 55. Wire spring 265 is operable to normally force the locking bar 55 into an open position, and therefore maintain the locking bar 55 in a disengaged relationship with the ratchet-shaped end plates 51 and 52 of spool 44. Spool 44 is rotatable when locking bar 55 is disengaged from end plates 52 and 52. The spool 44 is rotatably mounted to and between side walls 241 and 242, and includes an axle 45 extending through the side walls 241 and 242. A helical spring (not illustrated) is connected to the axle 45 and the frame 240, and is operable to urge the spool to rotate in the retracting direction.

Figure 14:
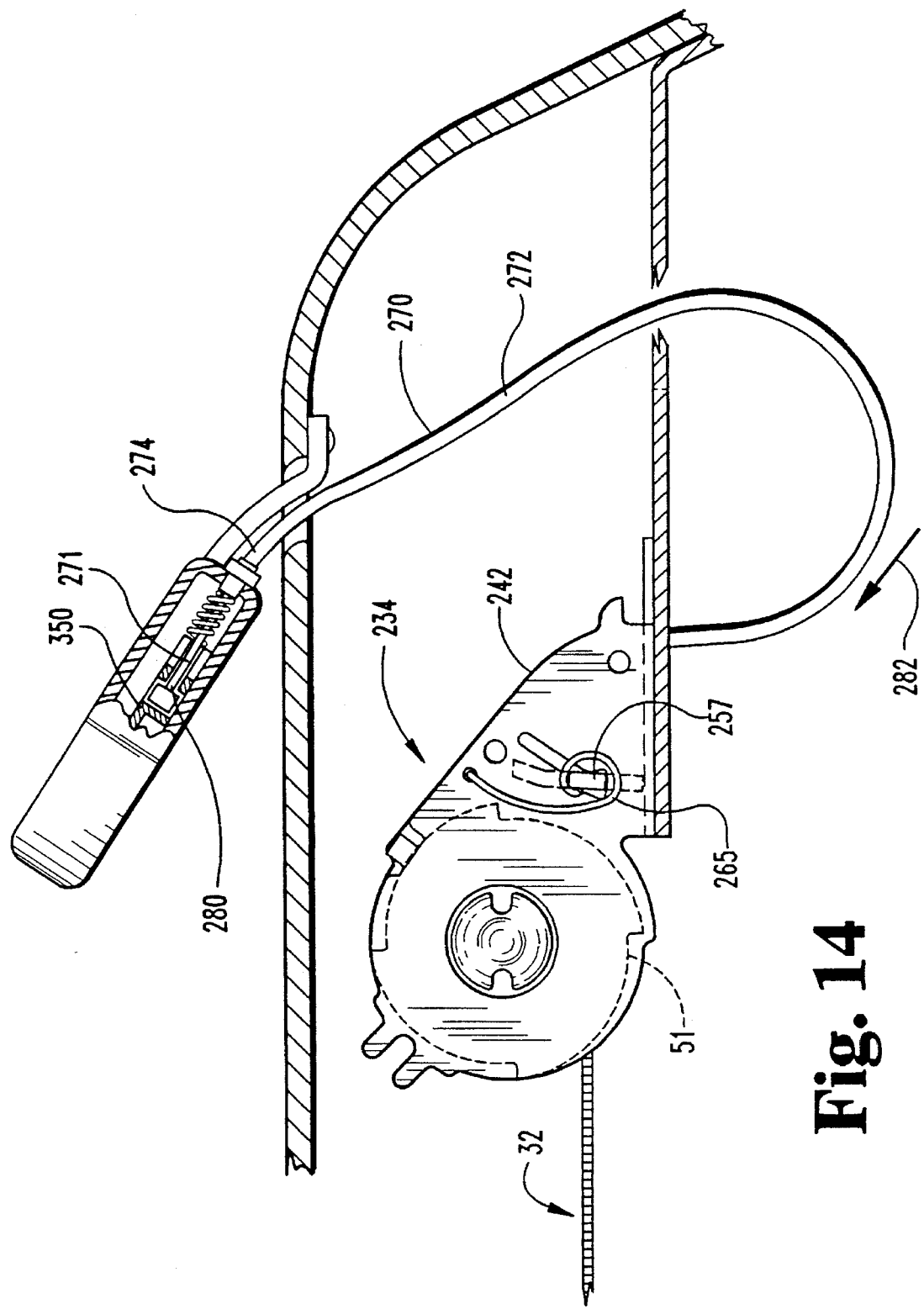
FIG. 14 is a fragmentary left side view of the retractor of FIG. 12 mounted to the bottom of a child seat.

A cable assembly 270, illustrated in FIGS. 12 and 14, includes wire 271 slidably disposed within a cable housing 272. The cable housing 272 includes a first end 273 securely connected to the cable mounting flange portion 247, and a second opposite end 274 attached to a buckle. The first end 273 of the cable housing 272 includes a mounting surface 275, and a lock ring retaining neck 276 that extends perpendicular from the mounting surface 275. Mounting surface 275 abuts the cable mounting flange portion 247 of the mounting bracket 235, adjacent to the clearance hole 250. Lock ring retaining neck 276 has a groove 277 formed therein for retaining a clamping device. Lock ring retaining neck 276 extends from the mounting surface 275 through clearance hole 250. A C-shaped clamp 278 engages the groove 277 formed in the lock ring retaining neck 276, thereby securing the cable housing 272 to the mounting bracket 235.

Wire 271 has a first end 279 fixedly mounted to the pivot attachment arm 255, and an opposite second end 280 attached to a cable actuator. The first end 279 of wire 271 engages a wire mounting slot 281 formed in the pivot attachment arm 255. The sliding movement of wire 271, in the direction of arrow 282, causes the pivot attachment arm 255 to rotate and forces the locking bar 55 into contact with the end plates 51 and 52 of spool 44. This engagement of the locking bar 55 with the end plates 51 and 52 prevents the spool 44 from rotating to allow any further withdrawal of web 32 from the retractor. Further, in an alternate embodiment the cable assembly 270 is connected to the cable mounting bracket 235 of the retractor such that the first end 279 of wire 271 exerts a pulling force on the pivot attachment arm 255. The pulling force causes the pivot attachment arm 255 to rotate and forces the locking bar 55 into contact with ratchet shaped end plates 51 and 52.

Figure 16:
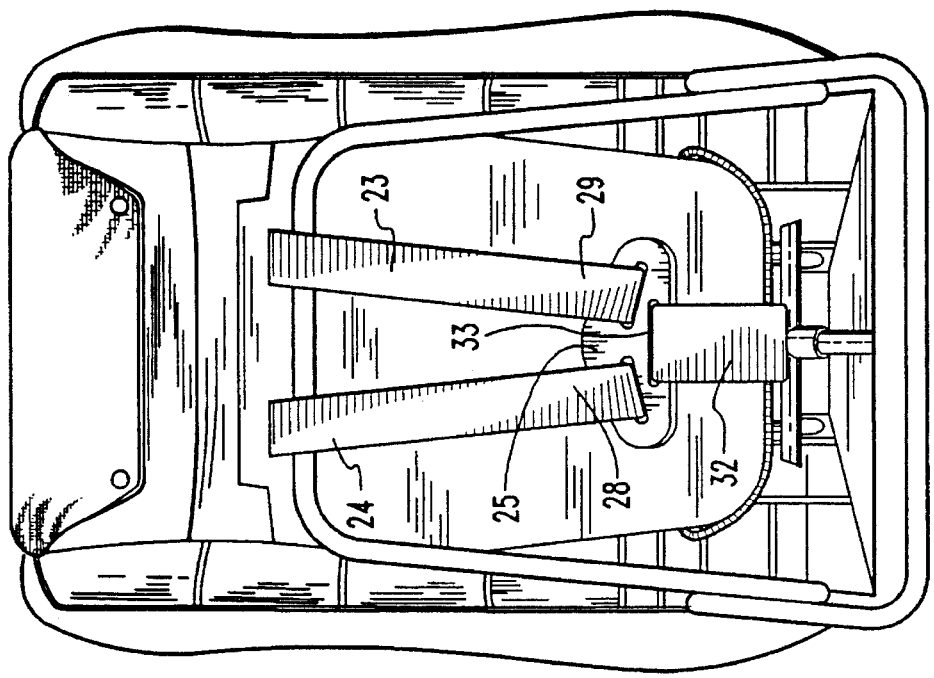
FIG. 16 is a rear elevational view of the seat of FIG. 15.
Figure 15:
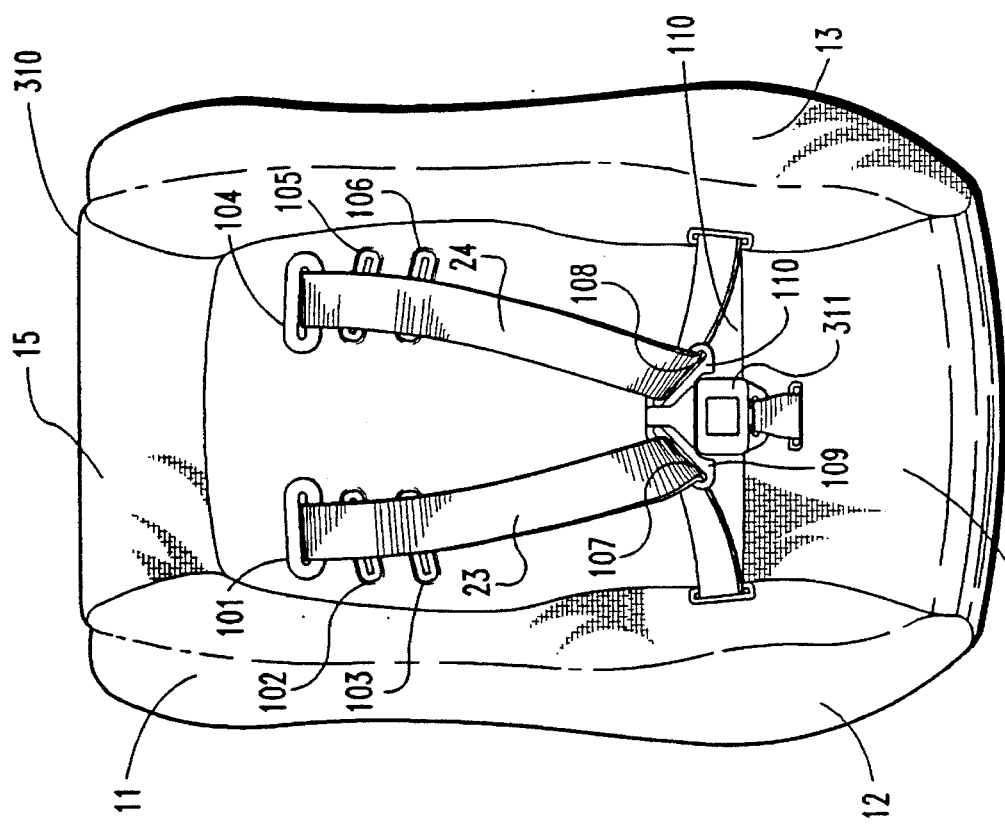
FIG. 15 is a front elevational view of a child seat incorporating the preferred embodiment of the new and improved retractor.

Referring now to FIGS. 15–24, three additional embodiments of the present invention, which are closely related, are disclosed. FIGS. 15 and 16 disclose the preferred embodiment of child seat 310 which is essentially identical to the child seat 10 previously disclosed with a few modifications. The child seat 310 has an outer frame 11 with a pair of downwardly extending arms 12 and 13 with a cushion seat area 14 and a cushion back support area 15 located therebetween.

The cushion back supporting area 15 includes a first set of slots 101–103 and a second set of slots 104–106. Belts 23 and 24 have first ends 29 and 28 (FIG. 16) secured to a conventional T-bar or belt connector 25 with the belts then extending through a slot formed in back supporting area 15. In the embodiment illustrated in FIG. 16, belts 23 and 24 extend slidably through slots 101 and 104 which are arranged to accommodate a large size child as compared to accommodating a small size child when the belts extend through slots 103 and 106. Belt 32 has a distal end 33 fixedly secured to belt connector 25 with the proximal end of belt 32 wrappingly mounted on a spool 44 of a retractor as previously described. The retractor assembly 234 is mounted to and beneath the child seat.

Figure 17:
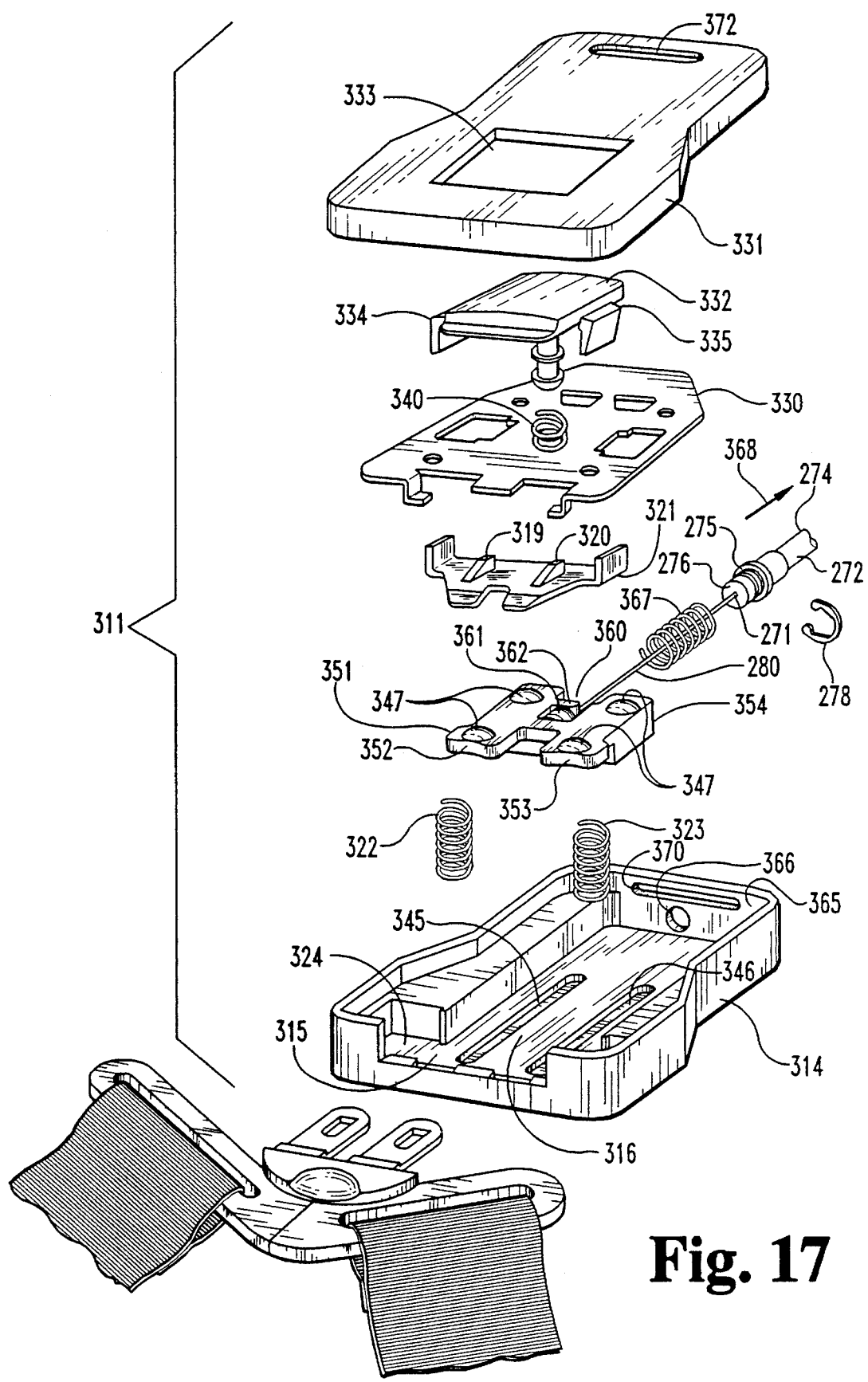
FIG. 17 is an enlarged partially exploded perspective view of the preferred embodiment of the buckle.

Belts 23 and 24 extend slidably respectively through slots 107 and 108 of tongues 109 and 110, in turn having blades releasably lockable with the preferred embodiment of buckle 311. (FIG. 15) Tongues 109 and 110 are similar to the buckle tongues disclosed in the commonly owned U.S. Pat. No. 5,023,981. The belt buckle 311 is lockingly engagable with the interlocking but separable buckle tongues 109 and 110, that comprise tongue 312 (FIG. 17). The buckle 311 is generally conventional in nature and is similar to the buckle disclosed in the commonly owned U.S. Pat. No. 5,023,981 which is herewith incorporated by reference. The improvement of the present invention includes integrating an actuator device 350 into the buckle 311.

Buckle 311, (FIG. 17), includes a main body 314 having a mouth 315 for receiving the leading edge of tongue 312 which extends into a cavity 316 formed in main body 314. Tongues 109 and 110 include apertures 317 and 318 through which two upraised portion 319 and 320 of latch pawl 321 project. A pair of springs 322 and 323 rest within cavity 316 and urge pawl 321 to the upward position whereat the pawl is locked to tongue 312. Springs 322 and 323 are positioned between the bottom wall 324 of main body 314 and the undersurface of latch pawl 321. A plate 330 is attached to main body 314 and in turn is attached to cover 331 with a push button 332 projecting partially through aperture 333 of cover 331. Push button 332 includes legs 334 and 335 that contact the upper surface of the latch pawl 321, once the push button is pushed sufficiently downward to unlatch the tongue 312. A spring 340 is positioned between push button 332 and plate 330 and is operable to force the button upward, but yieldable to allow the button to be depressed thereby releasing the latch pawl from the .tongues. The operator's depressing of push button 332 frees the latch 321 to the downward or unlocked position.

A pair of slots 345 and 346 are formed in the bottom wall 324 of the main body 314 to receive four guide pins 347 therein. The guide pins 347 are fixed to .actuator 350, and slidably guide and support the actuator 350 within the main body 314 of buckle 311, thereby retaining the actuator 350 captive in grooves 345 and 346. A first end 351 of the actuator 350 has forwardly opening concave surfaces 352 and 353 to respectfully engage the rounded distal ends of the buckle tongues 109 and 110. An opposite second end 354 of the actuator 350 has a retaining cavity 360 to receive a retaining ring 361 affixed to the second end 280 of wire 271. An arm 362 fixed to actuator 350 locks the retaining ring 361 within the cavity 360 of the actuator 350, thereby attaching the wire 271 to the actuator 350.

The rear wall 365 of the main body 314 has a substantially centrally located aperture 366, that receives the second end 274 of cable housing 272 therein. The second end 274 of cable housing 272 includes a mounting surface 275 and a lock ring retaining neck 276 that are identical to those affixed to the first end 273. The mounting surface 275 abuts the external surface of the rear wall 365, and the lock ring retaining neck 276 extends through the aperture 366 into the cavity 316. A C-shaped clamp 278 engages the lock ring retaining neck 276, thereby securing the cable housing 272 to the main body 314 of the buckle 311. An aperture 370 is formed in the main body 314, and is aligned with all aperture 372 that is similarly located in cover 331. The apertures 370 and 372 allow a seat belt web to securely attach the buckle 311 to the child seat 310.

Wire 271 extends through a helical spring 367 positioned between the rear wall 365 and the second end 354 of tile actuator 350. The helical spring 367 is operable to normally force the actuator 350 horizontally toward the mouth 315 of the buckle 311. The insertion of the buckle tongue 312 contacts the concave surfaces 352 and 353 of the actuator 350, causing the actuator 350 to slide horizontally backward compressing the spring 367 and displacing actuator 350 from a position atop pawl 321, thereby allowing the pawl 321 to lockingly engage the tongue 312. Further, the movement of the actuator 350 causes a corresponding movement of the wire 271. Thus by inserting tongue 312 into the buckle 311, the tongue is caused to contact actuator 350 thereby forcing wire 271 to move in the direction of arrow 368. The movement of wire 271 causes the pivot attachment arm 255 (FIG. 12) to rotate, and forces the locking bar 55 into contact with the ratchet shaped end plates 51 and 52 which prevents any further withdrawal of web 32 from the spool 44.

Figure 19:
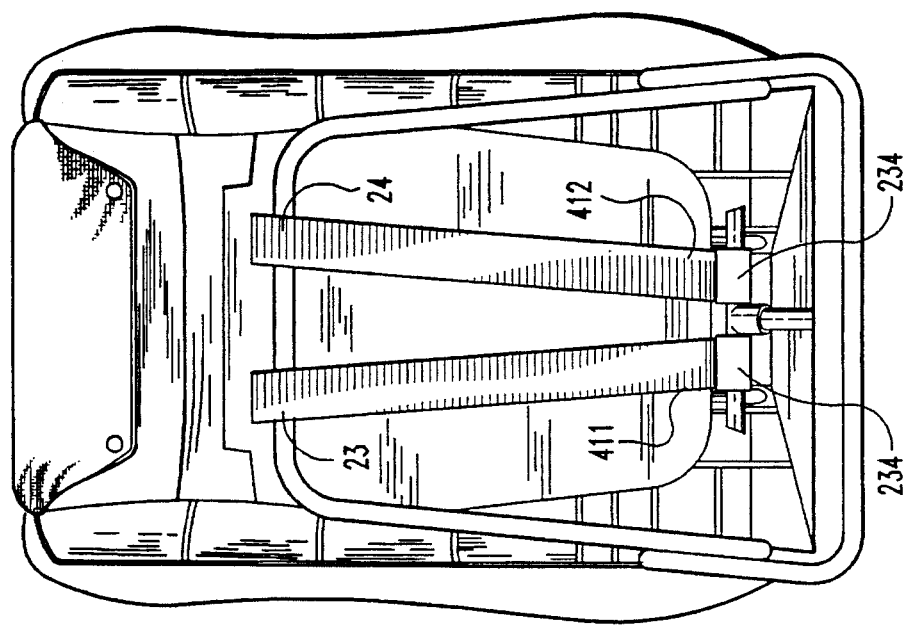
FIG. 19 is a rear elevational view of the seat of FIG. 18.
Figure 18:
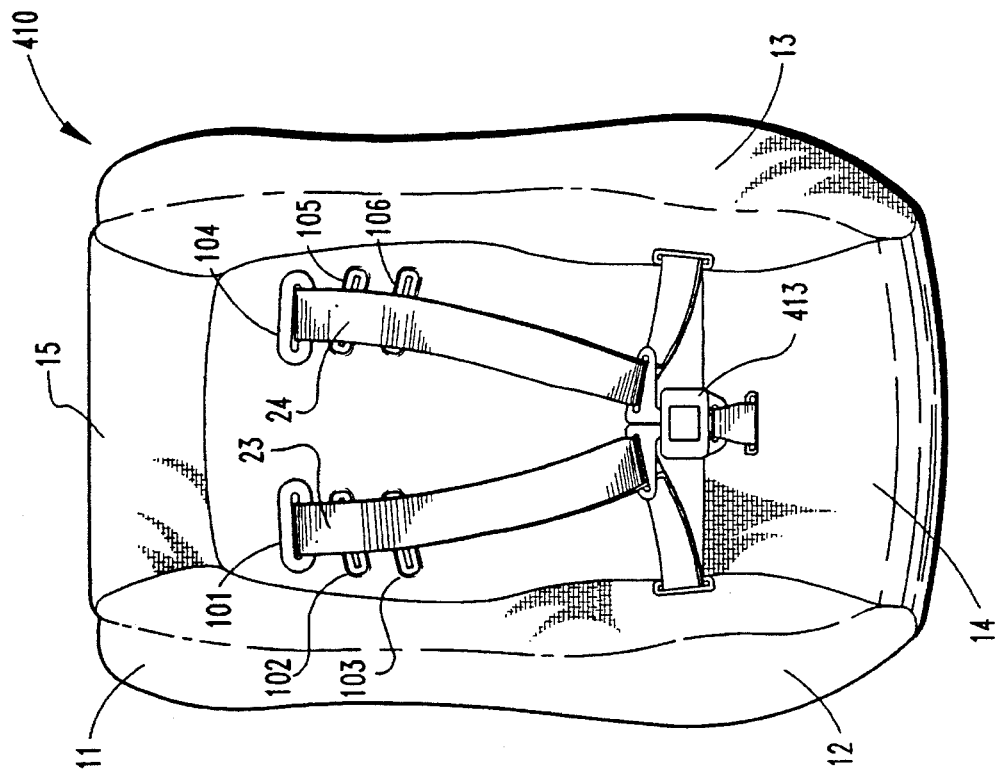
FIG. 18 is a front elevational view of a child seat incorporating an alternate embodiment of the new and improved retractor.
Figure 20:
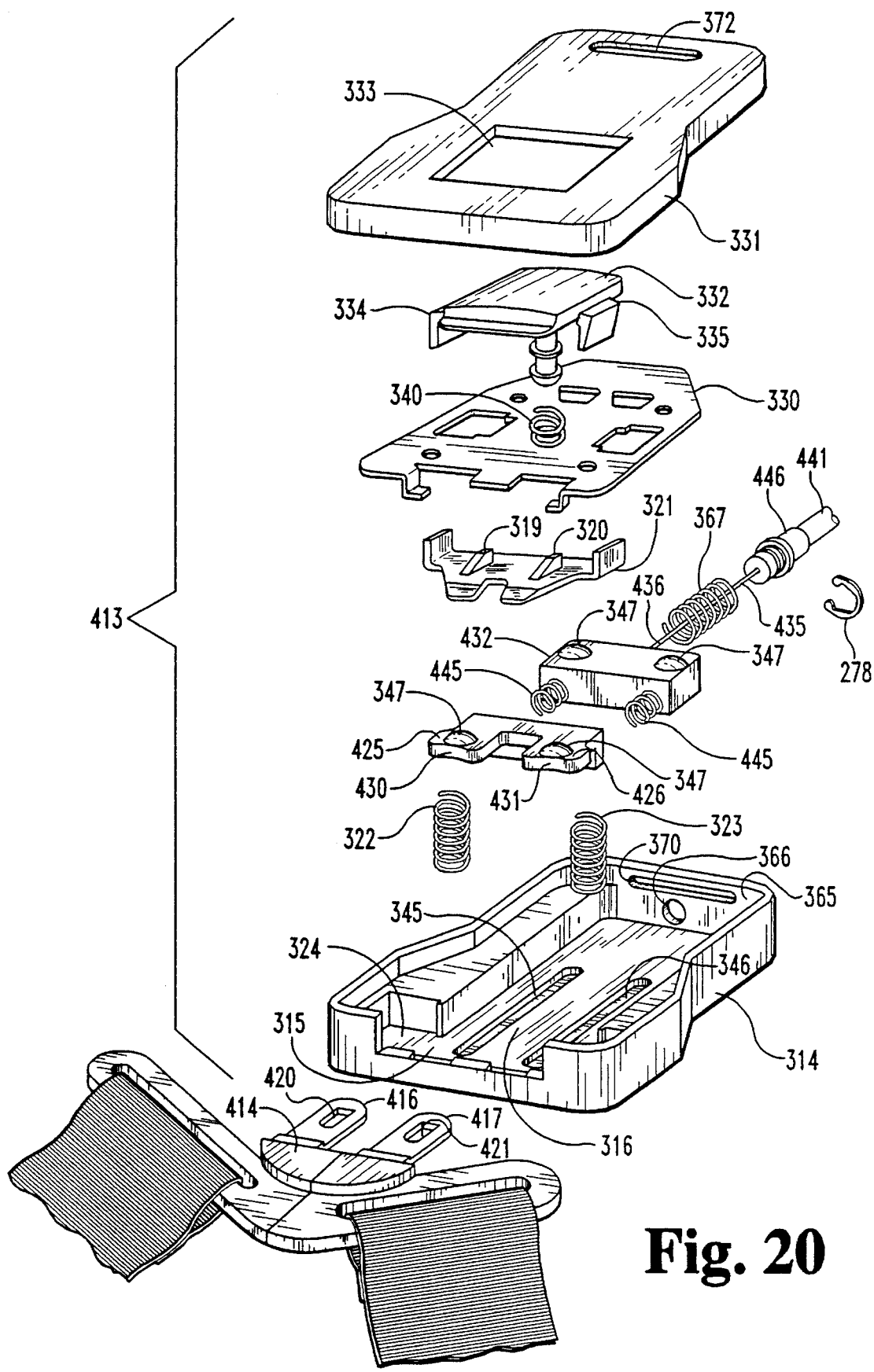
FIG. 20 is an enlarged partially exploded perspective view of an alternate embodiment of the new and improved buckle.

In FIGS. 18–20, there is illustrated a child seat 410 that is essentially identical to the child seat 310 previously disclosed with a few modifications. A pair of retractors 234 are mounted to and beneath the child seat 410. The spool of one of the retractors has mounted thereto end 411 of belt 23, whereas the other retractor has mounted thereto end 412 of belt 24. In an alternative embodiment (not illustrated) the pair of retractors 234 are mounted to the back of the child seat 410 instead of beneath the seat. Seat 410 includes buckle 413 (FIG. 20) which is essentially identical to the buckle 311 previously disclosed with the following modifications. The buckle 413 is lockingly engagable with a buckle tongue 414 having interactive tongues 416 and 417. An interactive tongue enables the operator to insert a first tongue 416 into the buckle 413 independent of the second tongue 417. During the insertion of the second tongue 417 into the buckle, the two tongues 416 and 417 having mating geometric features, slidingly engage and ultimately interlock. The inherent flexibility of the interactive tongues allows either tongue 416 or 417 to be inserted initially into the buckle 413, and with the subsequent insertion of the other tongue, the two tongues will ultimately interlock. Details pertaining to the interactive tongues are disclosed in the commonly owned and allowed U.S. patent application Ser. No. 08/009,327, filed on Jan. 26, 1993, which is herewith incorporated by reference. Buckle 413 includes a pair of actuators 425 and 426, whereas buckle 311 includes the single actuator 350.

A pair of slots 345 and 346 are formed in the bottom wall 324 of the main body 314 and receive guide pins 347 therein. The guide pins 347 are fixed to the pair of actuators 425 and 426, and slidably guide and support the actuators within slots 345 and 346. Actuators 425 and 426 have forwardly opening concave surfaces 430 and 431 to engage the rounded distal ends of the buckle tongues 416 and 417.

Figure 21:
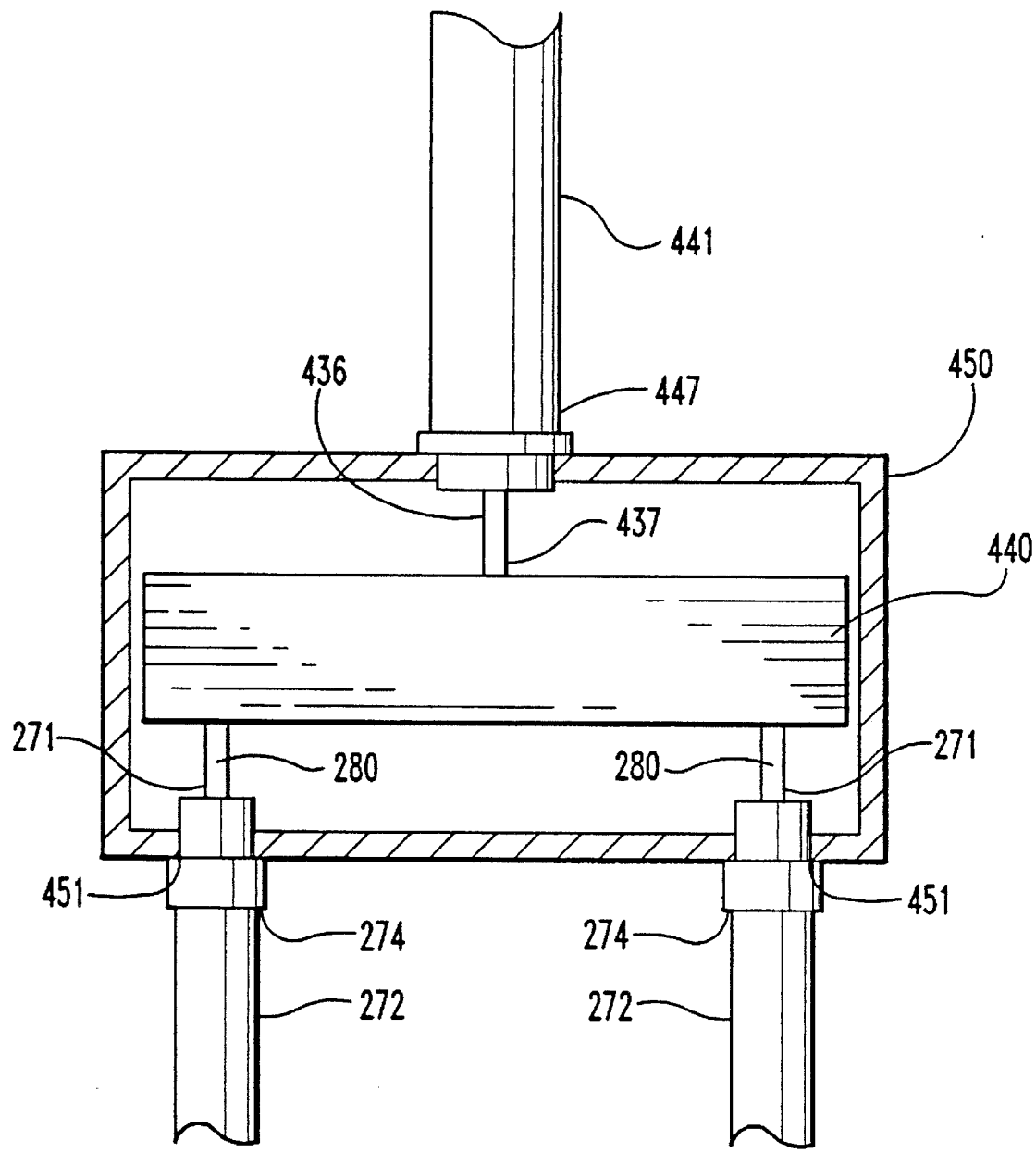
FIG. 21 is a plan view of the distribution bar housing in full section.

A wire attachment bar 432 is slidably positioned within cavity 316 of the buckle. The guide pins 347 are fixed to the wire attachment bar 432, and slidably guide and support the bar within slots 345 and 346. A first end 435 of a wire 436 is securely connected to the wire attachment bar 432, and a second end 437 of wire 436 is connected to a distribution bar 440 (FIG. 21). Both ends 435 and 437 of the wire 436 are securely connected to a substantially central portion of their respective bars by a conventional fastening technique. Further, the wire 436 is slidably disposed within a cable housing 441.

The first end 435 of wire 436 extends through a helical spring 367 positioned between the rear wall 365 of the buckle 413 and the wire attachment bar 432. Helical spring 367 is operable to normally force the wire attachment bar forward horizontally towards the actuators 425 and 426. A pair of springs 445 are disposed between the wire attachment bar 432 and the actuators 425 and 426 with the springs being operable to force the actuators horizontally forward towards the mouth 315 of the buckle 413. In one embodiment the springs 445 are helical, however an alternate embodiment (that is not illustrated) utilizes a strip spring.

The insertion of buckle tongue 416 contacts the concave surface 430 of actuator 425 causing the actuator 425 to slide horizontally backward, compressing the spring 445 and displacing actuator 425 from a position atop pawl 321. A subsequent insertion of buckle tongue 417 contacts the concave surface 431 of actuator 426 causing the actuator 426 to slide horizontally backward compressing the spring 445 and displacing the actuator 426 from a position atop pawl 321. Further, the actuators 425 and 426 together with the springs 445 form a mechanical linkage that transfers the movement of buckle tongues 416 and 417 to the wire attachment bar 432, which in turn slides horizontally backward. Furthermore, after both actuators 425 and 426 have been displaced from a position atop the pawl 321, the pawl 321 lockingly engages tongues 416 and 417.

The movement of wire attachment bar 432 in turn causes wire 436 to slide within the cable housing 441. Cable housing 441 includes a first end 446 that is securely connected to the buckle as previously disclosed, and a second end 447 that is attached to a distribution bar housing 450. The second end 447 of the cable housing 441 is securely attached to a distribution bar housing 450 by a conventional fastening device (FIG. 21). Slidably disposed within the distribution bar housing 450 is distribution bar 440 having attached at each end thereof the second ends 280 of wires 271. Each wire 271 is attached to a separate pivot attachment arm 255 (FIG. 12) provided on the pair of retractors 234 mounted to the seat, and receiving separately belts 23 and 24.

The distribution bar housing 450 is securely affixed to the child seat and includes two mounting apertures 451 to affix the second ends 274 of cable housings 272 thereto. The sliding movement of wire 436 causes the distribution bar 440 to move which in turn forces the wires 271 to correspondingly move. The movement of wires 271 causes the pivot attachment arms 255 to rotate and forces the locking bars 55 into contact with the ratchet end plates 51 and 52, which prevents the spools 44 from rotating to allow any further withdrawal of webs 23 and 24 from the pair of retractors 234. The locking bars remain in contact with the ratchet end plates 51 and 52 until the tongue 414 is released from the buckle.

Figure 23:
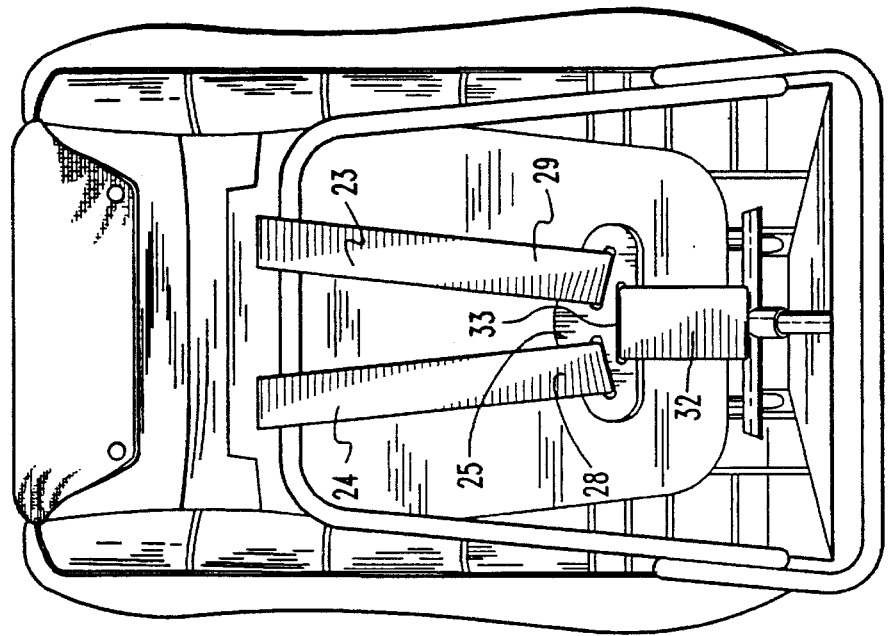
FIG. 23 is a rear elevational view of the seat of FIG. 22.
Figure 22:
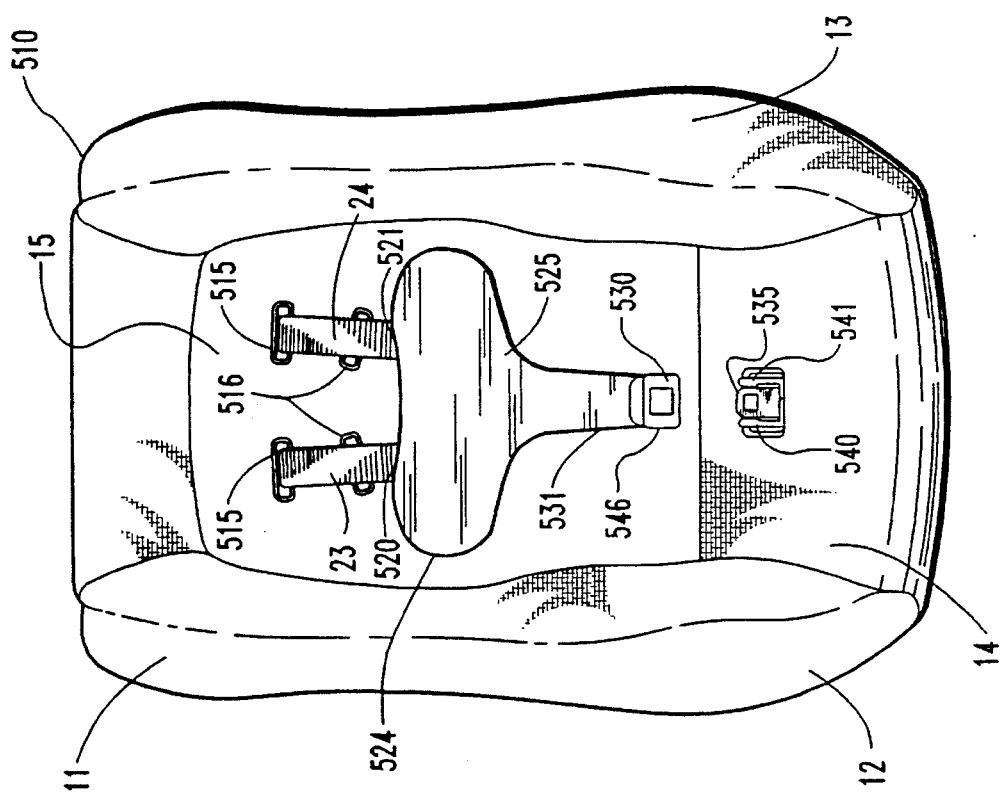
FIG. 22 is a front elevational view of a child seat incorporating an alternate embodiment of the new and improved retractor disclosed herein.

Referring now to FIGS. 22 and 23, there is illustrated a child seat 510 which is essentially identical to the child seat 310 previously disclosed with a few modifications. The child seat 510 is a further alternate embodiment and has an outer frame 11 with a pair of downwardly extending arms 12 and 13 with a cushion seat area 14 and a cushion back support area 15 located therebetween. The cushion supporting area 15 includes a pair of top slots 515 and a pair of bottom slots 516.

Belts 23 and 24 have first ends 29 and 28 secured to a conventional T-bar or belt connector 25 with the belts then extending through a slot formed in the back supporting area 15. The belts 23 and 24 extend slidably through the pair of slots 515 which are arranged to accommodate a large size child as compared to accommodating a small size child when the belts extend through slots 516. Belt 32 has a distal end 33 fixedly secured to belt connector 25 with the proximal end of belt 32 wrappingly mounted on the spool 44 of a retractor as previously described. The retractor assembly 234 is mounted to and beneath the seat.

The belts 23 and 24 have second ends 520 and 521 fixedly secured to the first upper end 524 of pad 525 which is positioned adjacent the front of the child. A conventional push button seat buckle 530 is rigidly attached to the second lower end 531 of pad 525. Conventional buckle tongue 535 is fastened to the child seat 510 by a conventional fastening device. Further the buckle 530 is lockingly engagable with the tongue 535 and the improvement herein includes integrating an actuator 536 into the child seat 510.

Figure 24:
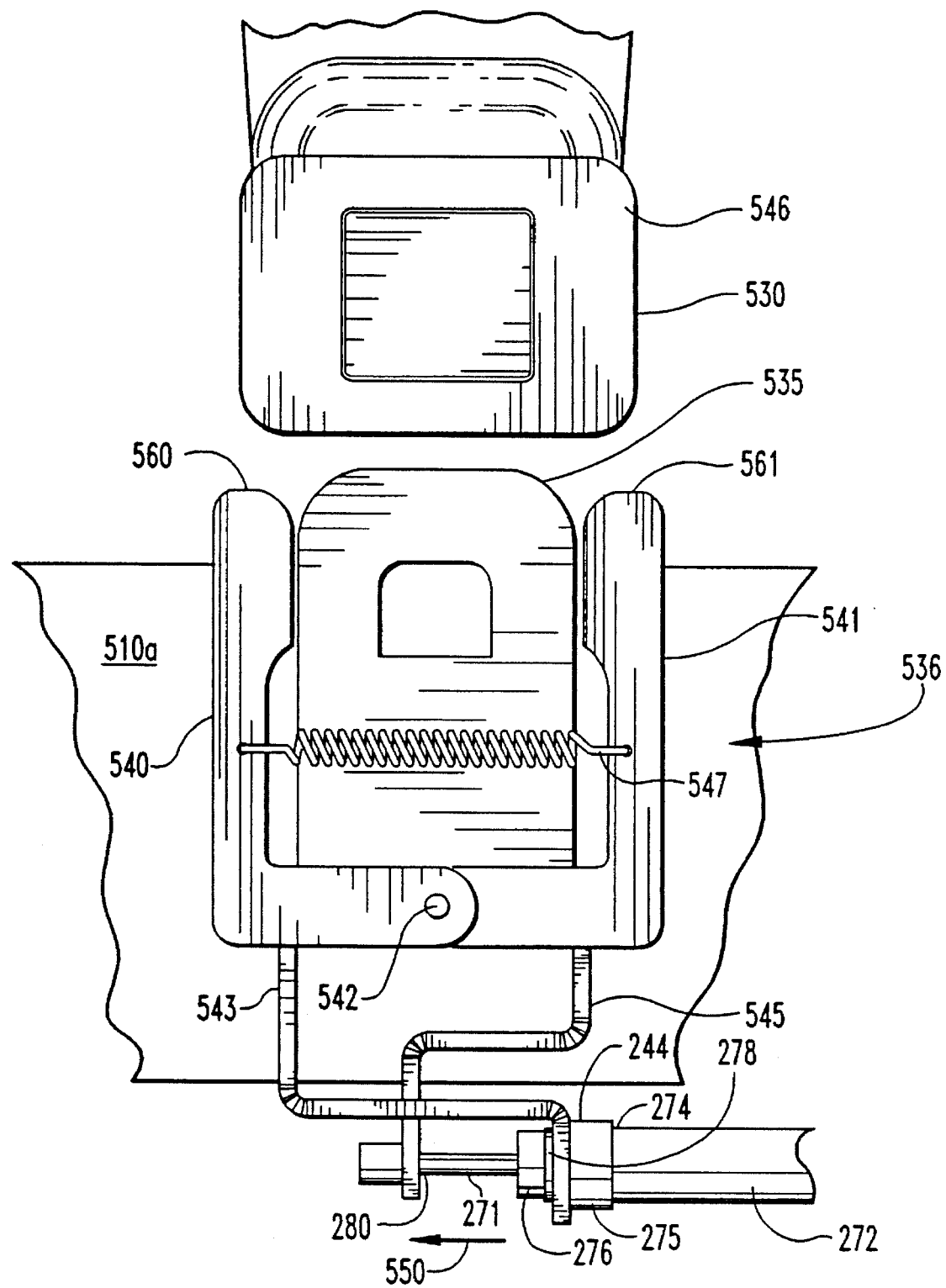
FIG. 24 is an enlarged fragmentary front elevational view of the child seat of FIG. 22 showing the actuator in the normal position.

Referring to FIG. 24, there is illustrated a cable actuator 536 that includes a pair of wings 540 and 541. In one embodiment, the wings 540 and 541 are pivotally mounted to a pivot pin 542. The pivot pin 542 is mounted to a bracket 510a that is permanently affixed to the child seat 510. Tongue 535 is mounted to bracket 510a between wings 540 and 541. A cable mounting arm 543, having a clearance hole 544, is fixedly attached to the wing 540. The clearance hole 544 receives the second end 274 of the cable housing 272 therein, The second end 274 of the cable housing 272 includes a mounting surface 75 and a lock ring retaining neck 276 as previously described. A C-shaped clamp 278 engages the lock ring retaining neck 276 and secures the cable housing 272 to the cable mounting arm 543.

A wire mounting arm 545 is fixedly attached to the wing 541. The second end 280 of wire 271 is in turn attached to the mounting arm 545. A spring 547 is attached to and extends between wings 540 and 541. Spring 547 normally urges the distal ends 560 and 561 of wings 540 and 541 towards each other, but is yieldable to allow distal ends 560 and 561 to move further apart when contacted by buckle 530 as the buckle is mounted onto tongue 535. Insertion of the buckle 530 onto the buckle tongue 535 causes the buckle body 546 to physically engage the distal ends 560 and 561 of wings 540 and 541. Further movement of the buckle 530 into a locking arrangement with the buckle tongue 535 overcomes a spring force exerted by spring 547, and forces the wings 540 and 541 to rotate about the pivot pin 542. The rotating of wings 540 and 541 forces the mounting arms 543 and 545 to be displaced from their normal position, thereby forcing wire 271 to slide within cable housing 272 in the direction of arrow 550. The sliding movement of wire 271 causes the pivot attachment arm 255 (FIG. 12) to pivot, and forces the locking bar 55 into contact with the ratchet end plates 51 and 52 which prevents any further withdrawal of web 32 from the spool 44.

The actuator 536 is used in combination with the retractor 234 to control the movement of locking bar 55. Cable assembly 270, as previously described, includes the wire 271 slidably disposed within the cable housing 272. The first end 273 of the cable housing 272 is connected to the cable mounting bracket 235 of the retractor 234, such that the first end 279 of wire 271 is connected to and exerts a pulling force on the pivot attachment arm 255. Wire 271 is arranged relative to arm 255 such that the pulling movement of wire 271 causes the pivot attachment arm 255 (FIG. 12) to pivot forcing the locking bar 55 into contact with the ratchet shaped end plates 51 and 52 which limits any further withdrawal of web 32 from spool 44.

In certain cases, the child seat will be originally installed with the vehicle main seat and will not be an added feature. In such a case, the retractor is not mounted to the child seat frame but instead is mounted to the vehicle main frame or the vehicle main seat frame.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A retractor for use with a child seat having a harness and interengaged combination of a tongue and seat belt buckle comprising:

a frame;

a spool to wrappingly receive a portion of said harness and having an axle and end walls at least one of which is configured as a ratchet wheel with said spool rotatably mounted to said frame;

a first spring mounted to said frame and normally urging said spool to rotate to a retracted position whereat a portion of said harness is wrapped thereon;

a locking bar parallel to said axle and mounted to said frame to be movable between a normal removed position whereat said locking bar is located apart from said ratchet wheel and a locking position whereat said locking bar lockingly engages said ratchet wheel limiting movement of said spool;

a cable having a first end attached to said locking bar and further having an opposite second end, said cable movable from a first position whereat said locking bar is in said removed position to a second position whereat said cable moves said locking bar to said locking position; and actuator means mountable to a child seat and connected to said second end of said cable, said actuator means including a pair of independently movable members, said actuator means operable upon movement of said movable members to move said cable to said second position, said cable movable to said first position when said movable members are released, further said actuator means is disposed within said seat belt buckle and wherein said tongue includes a pair of separable buckle tongues, said pair of buckle tongues contactable with said movable members.

2. A retractor for use with a child seat having a harness and interengaged combination of a tongue and seat belt buckle comprising:

a frame;

a spool to wrappingly receive a portion of said harness and having an axle and end walls at least one of which is configured as a ratchet wheel with said spool rotatably mounted to said frame;

a first spring mounted to said frame and normally urging said spool to rotate to a retracted position whereat a portion of said harness is wrapped thereon;

a locking bar parallel to said axle and mounted to said frame to be movable between a normal removed position whereat said locking bar is located apart from said ratchet wheel and a locking position whereat said locking bar lockingly engages said ratchet wheel limiting movement of said spool;

a cable having a first end attached to said locking bar and further having an opposite second end, said cable movable from a first position whereat said locking bar is in said removed position to a second position whereat said cable moves said locking bar to said locking position;

actuator means mountable to a child seat adjacent the tongue comprising:

a first wing and a second wing;

a pivot pin, said wings being pivotally mounted on said pin, said pivot pin mountable to said child seat; and said actuator means connected to said second end of said cable, said actuator means including a movable member and operable upon movement of said movable member to move said cable to said second position, the buckle contacts said actuator means for moving said movable member to move and hold said cable is in said second position, said cable movable to said first position when said member is released.

3. The retractor of claim 2 wherein:

said cable has an outer housing and an inner wire, said inner wire is slidably disposed within said outer housing, and wherein said outer housing is attached to said first wing and said wire is attached to said second wing.

4. A retractor for use with a child seat having a harness and an interengaged combination tongue and seat belt buckle comprising:

a frame including a pair of upstanding spaced apart arms;

a spool to wrappingly receive a portion of the harness and having an axle and end walls at least one of which is configured as a ratchet wheel with said spool rotatably mounted to said frame;

a first spring mounted to said frame and normally urging said spool to rotate to a retracted position whereat a portion of said harness is wrapped thereon;

a locking bar mounted to and extending between said arms parallel to said axle and movable between a normal removed position whereat said locking bar is unlocked from said ratchet wheel and a locking position whereat said locking bar lockingly engages said ratchet wheel limiting movement of said spool;

a second spring mounted to said frame and normally urging said locking bar to a removed position, said second spring is yieldable to allow said locking bar to move to said locking position;

a locking device connected to said locking bar, said locking device having a first position whereat said locking bar is in said removed position, and a second position whereat said locking bar is in said locking position, said locking device is mounted to said child seat adjacent the tongue, wherein the buckle contacts said locking device and moves said locking device to said second position;

said locking device comprising
a first wing and a second wing; and
a pivot pin, said wings being pivotally mounted on said pin, and said pivot pin is mounted to said child seat; and a cable extending between and connected to said locking device and said locking bar, said cable moves said locking bar to said locking position when said locking device moves to said second position.

5. The retractor of claim 4 wherein:

said cable has an outer housing and an inner wire, said inner wire is slidably disposed within said outer housing, and wherein said outer housing is attached to said first wing and said wire is attached to said second wing.

6. A child seat harness for installation in an automobile comprising:

a child seat configured to receive a child;

a harness mounted to said child seat and extendable over the child to secure the child within said child seat;

an interengaged combination tongue and seat belt buckle mounted to said child seat and interlockable with said harness;

at least one retractor, said retractor including a frame, a spool to wrappingly receive a portion of said harness and having an axle and end walls at least one of which is configured as a ratchet wheel with said spool rotatably mounted to said frame, a first spring mounted to said frame and normally urging said spool to rotate to a retracted position whereat said harness is wrapped thereon, a locking bar mounted to said frame and movable between a removed position whereat said locking bar is disengaged from said ratchet wheel and a locking position whereat said locking bar positively engages said ratchet wheel thereby limiting said spool from rotating to said retracted position;

at least one actuator means mounted to said child seat adjacent said tongue and connected to said locking bar, said actuator means being contactable by said buckle for moving said actuator means from a first position whereat said locking bar is in said removed position, to a second position whereat said actuator means moves said locking bar to and holds said locking bar in said locked position until released, said actuator means includes a first wing a second wing and a pivot pin, said wings are pivotally mounted on said pin and said pivot pin is mounted to said child seat, said actuator means including a cable means to move said locking bar; and said cable means extends from said actuator means to said locking bar and connects said actuator means and said locking bar, said cable means moves said locking bar to said locked position when said actuator means moves to said second position.

7. The harness of claim 6 wherein:

said cable has an outer housing and an inner wire, said inner wire is slidably disposed within said outer housing, and wherein said outer housing is attached to said first wing and said wire is attached to said second wing.

8. A child seat harness for installation in an automobile comprising:

a child seat configured to receive a child;

a harness mounted to said child seat and extendable over the child to secure the child within said child seat;

an interengaged combination tongue and seat belt buckle mounted to said child seat and interlockable with said harness, said tongue includes a pair of separable buckle tongues;

a pair of retractors, each said retractors including a frame, a spool to wrappingly receive a portion of said harness and having an axle and end walls at least one of which is configured as a ratchet wheel with said spool rotatably mounted to said frame, a first spring mounted to said frame and normally urging said spool to rotate to a retracted position whereat said harness is wrapped thereon, a locking bar mounted to said frame and movable between a removed position whereat said locking bar is disengaged from said ratchet wheel and a locking position whereat said locking bar positively engages said ratchet wheel thereby limiting said spool from rotating to said retracted position; and at least one actuator means mounted to said child seat and connected to said locking bar of each said retractors, said separable buckle tongues being operable for moving said actuator means from a first position whereat each said locking bar is in said removed position, to a second position whereat said actuator means moves each said locking bar to and holds each said locking bar in said locked position until released, said actuator means including a cable means to move each said locking bar.

9. The child seat harness of claim 8, wherein said separable buckle tongues having mating geometric features that slidingly engage and interlock.

10. The child seat harness of claim 9, wherein either of said buckle tongues are individually insertable into said buckle and the subsequent insertion of said other buckle tongue causes said buckle tongues to interlock.

11. A child seat harness for installation in an automobile comprising:

a child seat configured to receive a child;

a harness mounted to said child seat and extendable over the child to secure the child within said child seat;

an interengaged combination tongue and seat belt buckle mounted to said child seat and interlockable with said harness, said tongue includes a pair of separable buckle tongues;

a pair of retractors, each said retractors including a frame, a spool to wrappingly receive a portion of said harness and having an axle and end walls at least one of which is configured as a ratchet wheel with said spool rotatably mounted to said frame, a first spring mounted to said frame and normally urging said spool to rotate to a retracted position whereat said harness is wrapped thereon, a locking bar mounted to said frame and movable between a removed position whereat said locking bar is disengaged from said ratchet wheel and a locking position whereat said locking bar positively engages said ratchet wheel thereby limiting said spool from rotating to said retracted position;

at least one actuator means mounted to said child seat and connected to said locking bar of each said retractors, said separable buckle tongues being operable for moving said actuator means from a first position whereat each said locking bar is in said removed position, to a second position whereat said actuator means moves each said locking bar to and holds each said locking bar in said locked position until released, said actuator means is disposed within said seat belt buckle and said tongue is contactable with said actuator means, cable means extending from said actuator means to said locking bar and connecting said actuator means and said locking bar, said cable means moves said locking bar to said locked position when said actuator means moves to said second position; and a second spring engaged between said frame and said locking bar, said second spring being operable to urge said locking bar to said removed position but being yieldable to permit said locking bar to pivot said locking position when said actuator means moves to said second position.

12. The child seat harness of claim 11, wherein said separable buckle tongues having mating geometric features that slidingly engage and interlock.

13. The child seat harness of claim 12, wherein either of said buckle tongues are individually insertable into said buckle and the subsequent insertion of said other buckle tongue causes said buckle tongues to interlock.

14. A retractor for use with a child seat having a harness and interengaged combination of a tongue and seat belt buckle comprising:

a frame;

a spool to wrappingly receive a portion of said harness and having an axle and end walls at least one of which is configured as a ratchet wheel with said spool rotatably mounted to said frame;

a first spring mounted to said frame and normally urging said spool to rotate to a retracted position whereat a portion of said harness is wrapped thereon;

a locking bar parallel to said axle and mounted to said frame to be movable between a normal removed position whereat said locking bar is located apart from said ratchet wheel and a locking position whereat said locking bar lockingly engages said ratchet wheel limiting movement of said spool;

a cable having a first end attached to said locking bar and further having an opposite second end, said cable movable from a first position whereat said locking bar is in said removed position to a second position whereat said cable moves said locking bar to said locking position; and actuator means mountable to a child seat and connected to said second end of said cable, said actuator means including a pair of independently movable members, said actuator means operable upon movement of said movable members to move said cable to said second position, said cable movable to said first position when said movable members are released, further said actuator means being disposed within said seat belt buckle and wherein said tongue includes a pair of separable buckle tongues, said pair of buckle tongues contactable with said movable members and being operable for moving said actuator means from said first position to said second position.

15. The child seat harness of claim 14, wherein said separable buckle tongues having mating geometric features that slidingly engage and interlock.

16. The child seat harness of claim 15, wherein either of said buckle tongues are individually insertable into said buckle and the subsequent insertion of said other buckle tongue causes said buckle tongues to interlock.

* * * * *